(12) United States Patent
Cambou

(10) Patent No.: US 11,303,462 B2
(45) Date of Patent: Apr. 12, 2022

(54) UNEQUALLY POWERED CRYPTOGRAPHY USING PHYSICAL UNCLONABLE FUNCTIONS

(71) Applicant: Arizona Board of Regents on Behalf of Northern Arizona University, Flagstaff, AZ (US)

(72) Inventor: Bertrand F Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 221 days.

(21) Appl. No.: 16/683,943

(22) Filed: Nov. 14, 2019

(65) Prior Publication Data

US 2020/0162271 A1    May 21, 2020

Related U.S. Application Data

(60) Provisional application No. 62/769,462, filed on Nov. 19, 2018.

(51) Int. Cl.
*H04L 9/32* (2006.01)
*H04L 29/06* (2006.01)
*H04L 9/08* (2006.01)

(52) U.S. Cl.
CPC .......... *H04L 9/3278* (2013.01); *H04L 9/0861* (2013.01); *H04L 63/0428* (2013.01);
(Continued)

(58) Field of Classification Search
CPC . H04L 9/3278; H04L 9/0861; H04L 63/0428; H04L 63/1433; H04L 2209/04; H04L 2209/38
(Continued)

(56) References Cited

U.S. PATENT DOCUMENTS 7,392,396 B2    6/2008  Fernando et al.
8,627,131 B2    1/2014  Gunnam
(Continued)

FOREIGN PATENT DOCUMENTS

WO    2016133813 A1    8/2016

*Primary Examiner* — Dant B Shaifer Harriman
(74) *Attorney, Agent, or Firm* — Quarles & Brady LLP

(57) ABSTRACT

Systems and methods of authentication and encrypted communication between a server and client using independently-generated shared encryption keys are disclosed. Clients with arrays of physical-unclonable-function devices respond to server-issued challenges. The clients derive encryption keys from responses to those challenges generated by measuring PUF devices specified by the challenges. The clients send messages encrypted with the encryption keys to the server. The server independently reproduces the client-generated encryption keys using information about the PUF devices. When the keys match, the clients are authenticated. It may be desirable to inject errors into the challenge responses generated by the clients to improve security. When errors are injected, attackers cannot determine correct challenge responses except by brute force. When a sufficiently large number of errors are introduced, the server has sufficient computational power to successfully authenticate the client, but is computationally infeasible for an attacker to reverse engineer the correct responses.

20 Claims, 12 Drawing Sheets

(52) U.S. Cl.
CPC ...... *H04L 63/1433* (2013.01); *H04L 2209/04* (2013.01); *H04L 2209/38* (2013.01)

(58) Field of Classification Search
USPC ........................................................ 713/171
See application file for complete search history.

(56) References Cited

U.S. PATENT DOCUMENTS

| | | | |
|---|---|---|---|
| 8,913,741 B2 | 12/2014 | Billet et al. | |
| 8,958,553 B2 | 2/2015 | Tomlinson et al. | |
| 9,430,406 B2 | 8/2016 | Van Der Sluis et al. | |
| 9,628,272 B2 | 4/2017 | Rostami et al. | |
| 9,972,394 B2 | 5/2018 | Conte et al. | |
| 11,146,410 B2* | 10/2021 | Merchan | H04L 9/3278 |
| 2004/0078588 A1 | 4/2004 | Chow et al. | |
| 2008/0112596 A1 | 5/2008 | Rhoads et al. | |
| 2013/0132723 A1 | 5/2013 | Gaborit et al. | |
| 2014/0327469 A1 | 11/2014 | Pfeiffer et al. | |
| 2014/0331288 A1* | 11/2014 | Yu | H04L 63/08 726/4 |
| 2015/0134966 A1* | 5/2015 | Wallrabenstein | H04L 9/3221 713/174 |
| 2015/0188717 A1 | 7/2015 | Wu et al. | |
| 2015/0269378 A1* | 9/2015 | Falk | G06F 21/45 726/6 |
| 2016/0187432 A1 | 6/2016 | Saint-Marcoux et al. | |
| 2017/0070342 A1 | 3/2017 | Janus et al. | |
| 2017/0180140 A1* | 6/2017 | Mai | G06F 21/72 |
| 2018/0144147 A1 | 5/2018 | Nix | |
| 2019/0165956 A1* | 5/2019 | Adham | H04L 9/0838 |
| 2019/0165957 A1* | 5/2019 | Abbott | H04L 9/0643 |
| 2020/0034549 A1* | 1/2020 | Lu | H04L 9/30 |
| 2020/0052912 A1* | 2/2020 | Lu | G06F 21/57 |
| 2020/0076624 A1* | 3/2020 | Cambou | H04L 9/0643 |
| 2020/0119932 A1* | 4/2020 | Cambou | H04L 9/3239 |
| 2020/0162271 A1* | 5/2020 | Cambou | H04L 63/0435 |
| 2020/0295954 A1* | 9/2020 | Cambou | H04L 9/3278 |
| 2020/0396092 A1* | 12/2020 | Cambou | H04L 9/3234 |
| 2020/0412556 A1* | 12/2020 | Yoon | H04L 9/0891 |
| 2021/0111908 A1* | 4/2021 | Lu | H04L 9/0866 |
| 2021/0218583 A1* | 7/2021 | Adham | H04L 9/0866 |
| 2021/0281432 A1* | 9/2021 | Cam | H04L 9/0866 |

* cited by examiner

| Hamming Distance "a" | Numbers of 128-bit Streams | Matching Time: LPC | Matching Time: Server | Matching Time: HPC |
|---|---|---|---|---|
| 0 | $\binom{128}{0}=1$ | 5 μs | 50 ns | 0.05 ns |
| 1 | $\binom{128}{1}=128$ | 600 μs | 5 μs | 6 ns |
| 2 | $\binom{128}{2}=8,128$ | 40 ms | 400 μs | 400 ns |
| 3 | $\binom{128}{3}=341,376$ | 1.7 s | 17 ms | 17 μs |
| 4 | $\binom{128}{4}=10,668,000$ | 50 s | 500 ms | 500 μs |
| 5 | $\binom{128}{5}=2.6 \times 10^8$ | 20 min | 12 s | 12 ms |
| 6 | $\binom{128}{6}=5.4 \times 10^9$ | 6.7 hrs | 4 min | 246 ms |
| 7 | $\binom{128}{7}=9.5 \times 10^{10}$ | 5 days | 1.2 hrs | 4.3 s |
| 8 | $\binom{128}{8}=1.4 \times 10^{12}$ | 2.2 mo | 18 hrs | 1.1 min |
| 9 | $\binom{128}{9}=1.9 \times 10^{13}$ | 2.8 yrs | 10 days | 15 min |
| 10 | $\binom{128}{10}=2.3 \times 10^{14}$ | 34 yrs | 4 mo | 3 hrs |

FIG. 8B

| Hamming Distance "a" | Numbers of 256-bit Streams | Matching Time: LPC | Matching Time: Server | Matching Time: HPC |
|---|---|---|---|---|
| 0 | $\binom{256}{0}=1$ | 5 μs | 50 ns | 0.05 ns |
| 1 | $\binom{256}{1}=256$ | 1.2 ms | 12 μs | 12 ns |
| 2 | $\binom{256}{2}=32,512$ | 150 ms | 1.5 ms | 1.5 μs |
| 3 | $\binom{256}{3}=2,763,520$ | 12.7 s | 127 ms | 127 μs |
| 4 | $\binom{256}{4}=174,792,640$ | 13 min | 8 s | 8 ms |
| 5 | $\binom{256}{5}=8.9 \times 10^9$ | 11 hrs | 6.7 min | 400 ms |
| 6 | $\binom{256}{6}=3.6 \times 10^{11}$ | 20 days | 4.7 hrs | 17 s |
| 7 | $\binom{256}{7}=1.3 \times 10^{13}$ | 1.9 yrs | 7 days | 10 min |
| 8 | $\binom{256}{8}=4.0 \times 10^{14}$ | 57 yrs | 7 mo | 5 hrs |

FIG. 8A

| Hamming Distance "a" | Numbers of 64-bit Streams | Matching Time: LPC | Matching Time: Server | Matching Time: HPC |
|---|---|---|---|---|
| 0 | $\binom{64}{0}=1$ | 5 μs | 50 ns | 0.05 ns |
| 1 | $\binom{64}{1}=64$ | 300 μs | 3 μs | 3 ns |
| 2 | $\binom{64}{2}=2,016$ | 9.5 ms | 95 μs | 95 ns |
| 3 | $\binom{64}{3}=62,896$ | 200 ms | 2 ms | 2 μs |
| 4 | $\binom{64}{4}=953,064$ | 3 s | 30 ms | 30 μs |
| 5 | $\binom{64}{5}=1.1\times10^7$ | 35 s | 360 ms | 360 μs |
| 6 | $\binom{64}{6}=1.1\times10^8$ | 5.8 min | 3.5 s | 3.5 ms |
| 7 | $\binom{64}{7}=9.3\times10^8$ | 48 min | 29 s | 29 ms |
| 8 | $\binom{64}{8}=6.6\times10^9$ | 5.6 hrs | 3.4 min | 207 ms |
| 9 | $\binom{64}{9}=4.1\times10^{10}$ | 1.4 days | 20 min | 1.2 s |
| 10 | $\binom{64}{10}=2.3\times10^{11}$ | 7.5 days | 1.8 hrs | 6.6 s |
| 11 | $\binom{64}{11}=1.1\times10^{12}$ | 1.2 mos | 8.8 hrs | 32 s |
| 12 | $\binom{64}{12}=4.9\times10^{12}$ | 5.6 mos | 1.7 days | 2.4 min |
| 13 | $\binom{64}{13}=2.0\times10^{13}$ | 1.8 yrs | 6.7 days | 9.6 min |
| 14 | $\binom{64}{14}=7.2\times10^{13}$ | 6.6 yrs | 24 days | 35 min |
| 15 | $\binom{64}{15}=2.9\times10^{14}$ | 22.7 yrs | 1.9 mos | 2 hrs |

*FIG. 8C*

FIG. 9A — Table 900A (256-bit PUF CRP)

| 256-bit PUF CRP Error Rate % | Failure Rate (FRR) in % When Matching Responses with Hamming Distances "a" | | | | | Queries Needed for FRR < 0.1% | | | | | Matching Latency for HPC | | Matching Latency for LPC | |
|---|---|---|---|---|---|---|---|---|---|---|---|---|---|---|
| | a=1 910a | a=2 910b | a=3 910c | a=4 910d | a=5 910e | a=1 920a | a=2 920b | a=3 920c | a=4 920d | a=5 920e | 1Q 930a | 2Q 930b | 1Q 930c | 2Q 930d |
| 3 | 99 | 98 | 95 | 88 | 78 | NA | NA | NA | NA | 3 | NA | NA | NA | NA |
| 1 | 72 | 47 | 26 | 12 | 4.6 | NA | 4 | 2 | 2 | 1 | 400ms | 250μs | 11hr | 25s |
| 0.3 | 18 | 4.3 | 0.6 | 0.12 | 0.015 | 4 | 3 | 2 | 1 | 1 | 8ms | 12ms | 13min | 1ms |
| 0.1 | 2.8 | 0.23 | 0.015 | 0.01< | 0.01< | 2 | 2 | 1 | 1 | 1 | 1.5μs | 12ms | 150ms | 1ms |
| 0.03 | 0.28 | 0.01< | 0.01< | 0.01< | 0.01< | 1 | 1 | 1 | 1 | 1 | 12ms | - | 1ms< | - |
| 0.01< | 0.03 | 0.03< | 0.03< | 0.03< | 0.03< | 1 | 1 | 1 | 1 | 2 | - | - | - | - |

FIG. 9B — Table 900B (64-bit PUF CRP)

| 64-bit PUF CRP Error Rate % | Failure Rate (FRR) in % When Matching Responses with Hamming Distances "a" | | | | | | Queries Needed for FRR < 0.1% | | | | | | Matching Latency for HPC | | Matching Latency for LPC | |
|---|---|---|---|---|---|---|---|---|---|---|---|---|---|---|---|---|
| | a=5 | a=6 | a=7 | a=8 | a=9 | a=10 | a=5 | a=6 | a=7 | a=8 | a=9 | a=10 | 1Q | 2Q | 1Q | 2Q |
| 10 | 61 | 46 | 31 | 20 | 11 | 6 | NA | NA | NA | NA | 4 | 3 | NA | NA | NA | NA |
| 7 | 29 | 16.5 | 8.5 | 4 | 1.7 | 0.6 | NA | NA | 4 | 3 | 2 | 2 | NA | 2.4s | NA | 1.4days |
| 5 | 10.5 | 4.5 | 1.7 | 0.6 | 0.2 | 0.05 | 4 | 3 | 2 | 2 | 2 | 1 | 7s | 68ms | 7.5days | 1.5hr |
| 3 | 1.4 | 0.4 | 0.08 | 0.02 | 0.01< | 0.01< | 2 | 2 | 1 | 1 | 1 | 1 | 29ms | 1ms | 48min | 1min |
| 1 | 0.01< | 0.01< | 0.01< | 0.01< | 0.01< | 0.01< | 1 | 1 | 1 | 1 | 1 | 1 | 0.3ms< | - | 30s | - |
| 0.03< | 0.01< | 0.01< | 0.03< | 0.03< | 0.03< | 0.03< | 1 | 1 | 1 | 1 | 1 | 1 | 0.3ms< | - | 30s | - |

UNEQUALLY POWERED CRYPTOGRAPHY USING PHYSICAL UNCLONABLE FUNCTIONS

CROSS-REFERENCE TO RELATED APPLICATIONS

The present application claims priority to U.S. Provisional Application 62/769,462 entitled "Unequally-Powered Cryptography with Physical Unclonable Functions" and filed on Nov. 19, 2018.

BACKGROUND OF THE INVENTION

Physical unclonable functions (PUFs) that are unique to a device allow an authentication system to challenge a client seeking authentication, receive a response generated by the client using a PUF device, and then compare the received with a stored response previously received from the client or derived from characteristics of the PUF device and verifying that the two responses match. PUF technologies take advantage of unique characteristics of each device caused by natural manufacturing variations unique to that device. When clients seeking authentication have arrays of PUF devices, a number of possible challenge responses may be generated in response to varying challenges. The generation of challenge responses may need to be reproducible, predictable, and easy to recognize during the authentication process for the challenge-response authentication to be useful.

BRIEF SUMMARY

In an example embodiment a system comprises a physical-unclonable-function ("PUF") array of PUF devices, a processor configured to retrieve data from the PUF array, and a memory coupled to the processor. The memory stores instructions that, upon execution by the processor, cause the processor to: receive an authentication challenge from a server; measure physical characteristics of PUF devices forming a portion of the PUF array specified by the authentication challenge; and generate an authentication response based on the measured physical characteristics; receive a target error level indicating a number of errors desired in the authentication response; determine a required number of bits to be altered in a binary representation of the authentication response to produce the number of errors desired in the authentication response; alter bit values of a subset of bits of the authentication response having the required number of bits to generate a noisy authentication response; transmit the noisy authentication response to the server; and encrypt further communication with the server using a client-generated encryption key derived from the authentication response in response to receiving a message confirming successful authentication from the server.

In another example embodiment, a system comprises a processor, a physical-unclonable-function ("PUF") array of PUF devices, and memory coupled to the processor. The memory stores instructions that, upon execution by the processor, cause the processor to: receive an authentication challenge from a server; determine masking instructions identifying PUF devices belonging to the PUF array; determine a set of PUF devices forming a portion of the PUF array specified by the authentication challenge that excludes PUF devices identified by the masking instructions; measure physical characteristics of the set of PUF devices; generate an authentication response based on the measured physical characteristics and transmit the authentication response to the server; encrypt further communication with the server using a client-generated encryption key derived from the authentication response in response to receiving a message confirming successful authentication from the server.

In another example embodiment, a system comprises a processor, and memory coupled to the processor. The memory stores challenge-response data and executable instructions. Each challenge-response datum is associated with one of a plurality of client devices each having a respective physical-unclonable-function ("PUF") array having a respective plurality of PUF devices. Each challenge response datum is associated with an enrollment challenge issued to an associated client device and an initial response to that enrollment challenge obtained from the associated client device and derived from measurements of physical characteristics of PUF devices belonging to the PUF array of the associated client device.

Executing the instructions causes the processor to select, as an authentication challenge, a first enrollment challenge. The first enrollment challenge is retrieved from the memory and belongs to a challenge-response pair associated with a client device possessing a physical-unclonable-function ("PUF") array having a plurality of PUF devices. Executing the instructions further causes the processor to identify, based on challenge-response data associated with the client device, a set of unreliable PUF devices belonging to a portion of the PUF array of the client device specified by the authentication challenge; determine a desired number of errors in a response to the authentication challenge; and determine a number of unreliable devices of the set of unreliable devices having physical characteristics that will produce a response to the authentication challenge having the desired number of errors with a probability higher than a predetermined threshold when used to generate a portion of the response to the authentication challenge. Executing the instructions further causes the processor determine an expected response to the authentication challenge using an enrollment response belonging to the challenge-response pair from the database previously generated in response to the enrollment challenge by measuring physical characteristics of PUF devices of a portion of the PUF array identified by the enrollment challenge; and issue the authentication challenge to the client device.

Executing the instructions further causes the processor to issue masking instructions to the client device instructing the client device to generate a response to the authentication challenge. The response to the authentication challenge indicates measured characteristics of the first set of PUF devices belonging to the portion of the PUF array specified by the challenge and excludes information indicating measured characteristics of the second set of PUF devices belonging to the portion of the PUF array specified by the challenge. Executing the instructions further causes the processor to receive a response to the authentication challenge; authenticate the client based on the response to the authentication challenge; and transmit a notification to the client device indicating that the client device has been successfully authenticated.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIGS. 8A-C are tables illustrating performance characteristics of embodiments herein using PUFs under various assumptions of PUF error-rates.

FIGS. 9A-B are tables illustrating additional performance characteristics of embodiments herein using PUFs under various assumptions of PUF error-rates.

DETAILED DESCRIPTION

Figure 1:
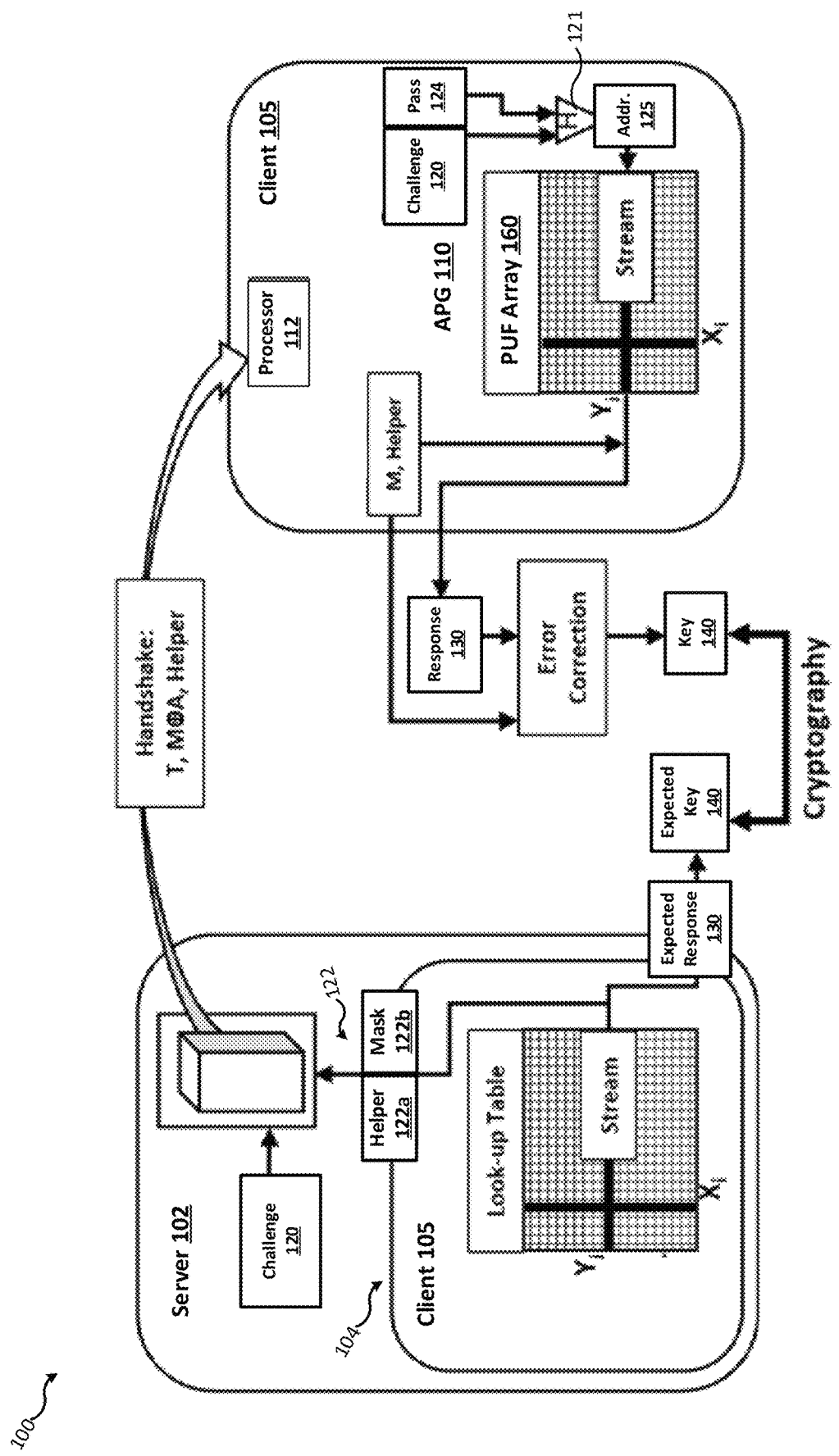
FIG. 1 is a block diagram illustrating a system and method according to an embodiment disclosed herein for authentication and secure communication using challenge-response authentication between a server and a client device having an addressable PUF generator (APG).

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional systems and methods for challenge-response authentication have disadvantages. For example, when the server and the client communicate over an insecure channel, both the challenges and the challenge responses may be intercepted, providing information which may be useful to an attacker. PUF-based challenge response authentication schemes use physical devices ("PUF devices") having measureable characteristics which only a client in possession of those devices can measure as a "fingerprint." A server which stores or has access to previous measurements of the devices issues a challenge to the client which instructs the client to measure the devices (or a subset) and generate a response to the challenge which includes the measurements or other information derived from the measurements. For example, a server might send a challenge to which the client responds by measuring a particular subset of devices and then performing a mathematical operation on those measurements. Some PUF devices may have more than one measurable characteristic which can be used to generate a challenge response. As an example, an array of transistors having slight performance variations due to variation in manufacturing processes may be used. Measurable characteristics of such transistors might include threshold voltages, channel resistances, and the like. The client may then encode or otherwise transform measurements of such characteristics into a response.

While PUF-based authentication may be attractive, there may be variation in the measured characteristics due to changes in conditions (e.g., temperature of the devices). In addition, PUF-based challenge response systems may experience errors due to nondeterministic behavior of individual devices in PUF arrays. Even if these error rates are acceptable for authentication purposes, they are often much too high for other applications such as allowing two devices to agree on a shared encryption key. For example, if a challenge response contains measurements of hundreds of devices and all but one or a few portions of the response match the expected response, a server may still be able to authenticate a client with high confidence. However, some approaches may be more sensitive to errors. If, for instance, the client encrypts messages to the server using a key based on a challenge response and the server needs to decrypt those messages using a key similarly derived from the expected challenge response, even a single bit error may render the encrypted messages unreadable by the server.

Consequently, PUF-based authentication and encryption schemes may employ error-correction on the client side to reduce or nearly eliminate errors in responses. However, when challenges and responses are transmitted over insecure networks, the use of error correction approaches may result in information leakage if the responses are intercepted by an attacker or if an attacker executes a man-in-the-middle (MITM) attack.

Accordingly, embodiments disclosed herein address these and other shortcomings by enabling servers to authenticate and communicate with client devices having addressable physical unclonable function (PUF) generators (APGs) capable of extremely low error rates suitable for communication with the server over secure channels while also allowing the client devices to intentionally introduce errors and/or implement error correction procedures with reduced error correction efficacy. Intentionally introducing errors into the responses means that an attacker may be prevented from ever directly receiving a valid response, even if the attacker is able to impersonate the server. The greater the number of errors in each response, the harder it will be for an attacker to gain information revealing the correct response to a given challenge. This comes at the expense of also making it harder for the server to authenticate the client because the authentication algorithms become more complex.

Responses with heightened error rates can still be used for authentication purposes when the server implements error-correction protocols including response-based cryptography (RBC) schemes, described further herein. Authenticating responses with increased error may be computationally expensive but can improve security controlled introduction of errors to the responses such that, even if an attacker intercepts challenge responses, the correct responses are not compromised and reverse-engineering of the correct responses is made too computationally complex to be practical for an anticipated attacker who may only have access to limited computing resources, but well within the computational capabilities of the server.

In some embodiments, the desired number of errors in the responses may be determined by the server or the client based on a security assessment, as a non-limiting example. For instance, the client or the server may determine, based on the client's geographical location, communication networks used by the client to communicate with the server or other factors, that a particular authentication transaction requires greater security and, hence, a greater number of errors in the responses. As another non-limiting example, an institution such as a bank may provide differing levels of security for different customers or different transactions. For instance, a customer may have the option of selecting enhanced security on a per-transaction, per-device, or per-account basis. A further non-limiting example is introducing errors to increase security when a user is known to handle sensitive information; the server may determine that the user is in an insecure location and increase the security level.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical). The quantification of the quality of the PUF may be given by the Hamming distances (or another similarity metric) between initial responses and subsequent responses, also defined as the challenge-response pair (CRP) error rate. Hamming distance is used throughout this disclosure as a useful measure of the similarity or difference between two strings (such as challenges and responses). However, it should be understood that other measures of the similarity or difference between two strings may be used and that Hamming distances are used herein for the purposes of illustration. The Hamming distance may be particularly useful when PUF responses are sequential strings with each element generated by accessing a distinct PUF device belonging to an array. In this instance, the Hamming distance between a response to a challenge and an earlier response (or expected response) to that same challenge will indicate the number of PUF devices which produced unexpected outputs.

According to various embodiments, a PUF-enabled authentication protocol includes the following stages: (1) Enrollment, (2) Handshaking, and (3) Authentication/Encryption Key generation. These stages are described below, beginning with reference to FIG. 1 illustrating an example environment 100 in which embodiments disclosed herein may be practiced. The environment 100 includes a server 102 and client devices, hereinafter clients 105. The server 102 manages a database 104 which may be stored in memory of the server 102. The database 104 stores a set of initial challenge responses 130, which may be generated in response to challenges issued by the server 102 to the clients 105, each of which may respond to the challenges by accessing a respective PUF array 160 belonging to that clients 105. Alternatively, the server 102 may be otherwise provided with information suitable to generate the initial challenge responses 130.

The client 105 has an addressable PUF generator 110. The PUF array 160 may form part of the APG 110 as described further below. The APG 110 may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted. The PUF array 160 of a client 105 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 160) may be unique, even if the PUF arrays are mass-produced by a process designed to produce nominally identical devices. The PUF array 160 (shown as a 2D-array of cells) of a client 105 may be accessed by the client 105 which receives challenges 120 (originating in this example from the server 102). The APG 110 responds by to challenges 120 by generating responses 130 using measured characteristics of one or more PUF devices within the PUF array 160 identified by the challenge 120 or derived from it using instructions stored by the APG 110.

Each client 105 has an APG 110 containing a PUF array 160 that is unique to that client 105. The APG 110 of a client 105 may be used to generate numerous responses 130 (i.e., responses unique to that client 105). These responses 130 cannot be replicated by an attacker without physical access to the PUF array 160. During the Enrollment stage, the server 102 may obtain the initial responses 130 for each client 105 by generating all possible challenges 120 and storing responses 130 to those challenges 120 generated by each APG 110 in a database 104. Alternatively, the server 102 may be otherwise supplied with characteristics of each PUF array 160 sufficient to generate the expected responses 130. The processor 112 may include instructions to combine information from the challenge 120 with additional information (such as a user password 124) and pass the combination through a hash function 121 the result to produce the address 125 (or range of addresses) within the PUF array 160 to measure in order to generate the proper response 130.

After the clients 105 are enrolled with the server 102, embodiments disclosed herein may be utilized to authenticate the client 105 and produce an encryption key which the server 102 and client 105 may use to communicate securely. First, the server 102 and a client 105 enter the Handshaking stage. In the Handshaking stage an objective is for the server 102 to transmit the information needed to identify a particular portion of the PUF array 160 of the client 105. Both the server 102 and the client 105 can independently produce a response to the challenge: the server can lookup information about the PUF array 160 obtained during enrollment (or otherwise supplied to the server 102) and the client 105 can retrieve the same information by using the APG 110 to access the PUF array 160.

During Handshaking, the server 102 issues a challenge 120 to the APG 110 of the client 105. This challenge 120 is used by the APG 110 to identify the portion of the devices belonging to the PUF array 160 to access. This challenge 120 may be a random number. In some embodiments such as embodiment 100, the server 102 and the client 105 may have access to the same random number generator or may have synchronized random number generators. In such embodiments, the server 102 does not need to transmit the challenge 120 to the client 105 in order for the client 105 to generate the challenge response 130 using the APG 110.

In embodiment 100 and similar embodiments the ability of the client 105 to generate the challenge response 130 may be protected by a password 124. In such embodiments, the address 125 specifying which device(s) in the PUF array 160 to access may be produced by combining the challenge 120 with the password 124. As a non-limiting example, the client 105 may input the password and the challenge into a hashing function to produce the address in the PUF array 160. As an example, if the PUF array 160 is represented as a two-dimensional array containing 256 rows and 256 columns, 8 bits of the message digest can be used to find the first coordinate X in the PUF array 160; the following 8 bits can be used to find the second coordinate Y.

As discussed above, the measurement of characteristics of individual PUF devices may not be perfectly deterministic. As part of the Handshaking process, the server 102 may send additional information 122 to the client 105 for use in making generation of the challenge response 130 more reliable. The additional information 122 may include error correction instructions 122a (sometimes called a "helper" or "helper instructions") and/or masking instructions 122b. The error correction instructions 122a may include a checksum or other error-correcting information for use with error-correcting codes, or other information or instructions used in response generation schemes to be discussed later below. The masking instructions 122b instruct the APG 110 to exclude cells which the server 102 characterized as unreliable cells during Enrollment. The APG 110 may generate corrected responses 132 which simply exclude measurements of the unreliable cells. Alternatively the processor 112 may measure additional cells to ensure that the corrected challenge responses 132 are of a specified length. The processor 112 may store instructions for selecting the additional cells to measure, or may receive such instructions as part of the additional information 122.

Upon receiving the challenge response 130, the APG 110 may use the additional information 122 to generate corrected responses 132. Use of the additional information 122 and other methods of improving the reliability of the APG 110 will be discussed further below. The corrected responses 132 may be used directly as encryption keys 140 or may otherwise be used to derive the encryption keys 140. The server 102 may similarly independently produce the encryption keys 140 using the initial responses 130 stored in the database 104. The server 102 and the client 105 may then communicate securely by encrypting messages using the shared encryption keys 140 or encryption keys derived from them (e.g., public keys corresponding to the keys 140 according to an asymmetric cryptographic scheme).

The server 102 can authenticate a client 105 by issuing the challenge 120 to the client 105 and then comparing the corrected challenge response 132 generated by APG 110 with the initial response to that challenge stored by the server 102 for that client 105 (e.g., initial challenge responses 130) or determine that the corrected challenge response 232 is consistent with the initial challenge response 130 by comparing information derived from the corrected challenge responses 132 with information derived similarly by the server 102 from one of the initial challenge responses 130 corresponding to the challenge 120 issued by the server. The server 102 may require that the corrected response 132 is identical to the expected response to the challenge 120 (i.e., the initial response 130 corresponding to the challenge 120) in order to authenticate the client 105. Alternatively, the server 102 may accept a corrected response 132 with a Hamming distance (or a value of another distance metric) less than a predetermined maximum value from the expected response as evidence that the challenge response 130 is consistent with the expected response. For example, the server 102 may infer that the client 105 has generated a response which differs by less than a predetermined maximum number of symbols from the initial response 130 and determine that the challenge response 130 is consistent with the initial response 130 (i.e., was generated by a client 105 in possession of the same PUF array used to obtain the initial response 130). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

As noted above, it is ordinarily desirable that the CRP error rate of a given APG is low. This becomes even more important if the responses 130 are used to generated encryption keys, as contemplated herein. This is because even a single-bit error in an encryption key may produce a ciphertext which cannot be correctly decrypted. Although the use of error correction instructions (e.g., the error correction instructions 122a) can reduce error rates, such approaches have disadvantages. First, the client devices (e.g., the clients 105) need to consume additional computing resources to implement the error correction instructions (e.g., error-correcting codes, fuzzy extractors, et al.). However, in some applications doing so may result in increased complexity and power consumption and may be impractical (e.g., in IoT and other low-power devices). Second, such protocols increase the vulnerability to side-channel attacks, differential power analysis, and potential exposure of the error corrections. In addition, the use of APGs to generate challenge responses for use in generating encryption keys is more challenging than using APGs to generate responses for authentication. For example, if the server 102 generates an encryption key (e.g., an encryption key 140) using one of the initial responses 130 and a client 105 attempts to generate the same encryption key from responding to an appropriate challenge 120, the process will fail if the client-generated encryption key differs from the server-generated encryption key by even a single bit. However, typical PUF arrays may exhibit CRP errors at rates of approximately 3-10% due to temperature changes, noise sources, aging, or other parameter drifts. Thus it is important to improve CRP error rates or correct CRP errors. Embodiments disclosed herein may therefore employ various other schemes for reducing CRP error rates.

In some embodiments, ternary PUF schemes may include characterizing each PUF device in a PUF array (e.g., a PUF array 160). During Enrollment, the server issues each possible challenge repeatedly and tracks the statistical distribution of values included in the challenge responses The server then assigns the elements of each challenge response corresponding to individual PUF devices to one of three ternary states, which will be referred to using the ternary digits {−, x, +}. Measured device characteristics which fall within a first range of values are assigned the ternary value '−'. Measured device characteristics which fall within a second range of values exclusive of the first range are assigned the ternary value '+'. Measured device characteristics which fall within a third range of values exclusive of the first range and the second range are assigned the ternary value 'x'.

For example, if the PUF devices are SRAM cells, the measured device characteristics may be the frequency of the binary data states stored by the SRAM cells after power cycling. Cells which are always (or almost always) in the '0' state may be assigned to the '−' ternary state, while cells which always in the '1' state may be assigned to the '+' ternary state. Meanwhile, cells which are "unreliable" fluctuate between the '0' and '1' state may be assigned to the 'x' ternary state. The resulting ternary representations may be stored by the server in the database as initial challenge responses for the clients. The server may disregard values generated using unreliable cells when comparing challenge responses to expected challenge response. In some embodiments, the may send instructions to exclude previously-characterized unreliable cells to the client. For example, if a challenge requires a 256-bit response the instructions may instruct the client to select the first 256 devices which are not excluded from the challenge generation process started at a given address The CRP rate can be significantly reduced using this approach when a sufficiently large number of initial responses are gathered in response to each challenge. In some embodiments the server shares the location of the unreliable cells with the clients during the Enrollment process, thereby reducing the size of the instructions transmitted by the server during subsequent authentication and generation of challenge responses by the clients since the clients are able to store the information necessary to exclude the unreliable cells from the challenge generation process.

The value of using the ternary PUF methods above has been demonstrated with SRAM PUF devices based on commercially-available SRAM. SRAM PUFs exploit power-off/power-on cycles. Due to manufacturing variations, the flip-flop of each SRAM cell will randomly power up in the '0' state or the '1' state. The vast majority of the cells respond in a predictable way, therefore acting as a "fingerprint" of the device. The SRAM PUFs characterized exhibited a cumulative 3-5% CRP rate after each power-off/power-on cycle. The memory cells were then subjected to successive power-off/power-on cycles and cells exhibiting inconsistent behavior were deemed unreliable and represented by the ternary 'x' state as described above. After 50 cycles, the 'x' state was assigned to 10% of the cells. For the remaining cells which were not assigned the 'X' state, the error rate was in the 0.01-0.03% range.

Figure 2A:
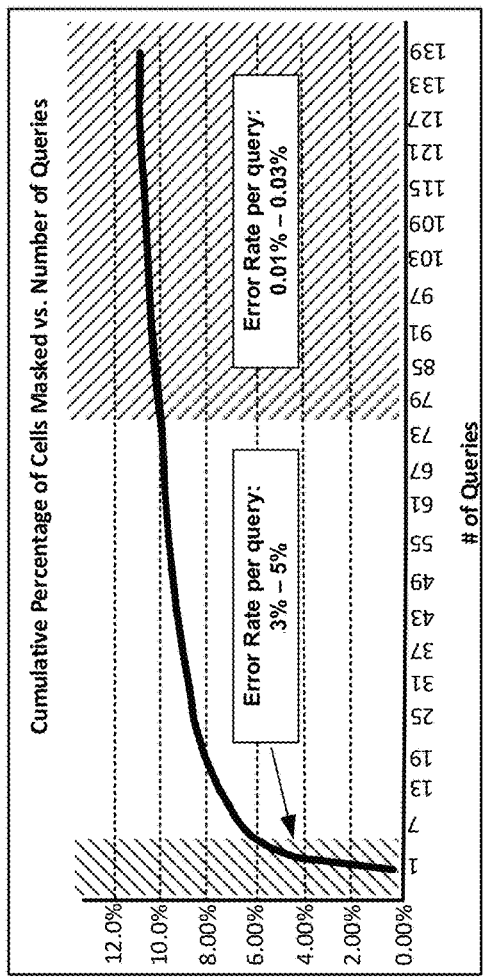
FIGS. 2A-C depict results of experimental performance measurements on an APG suitable for use in the embodiment of FIG. 1
Figure 2B:
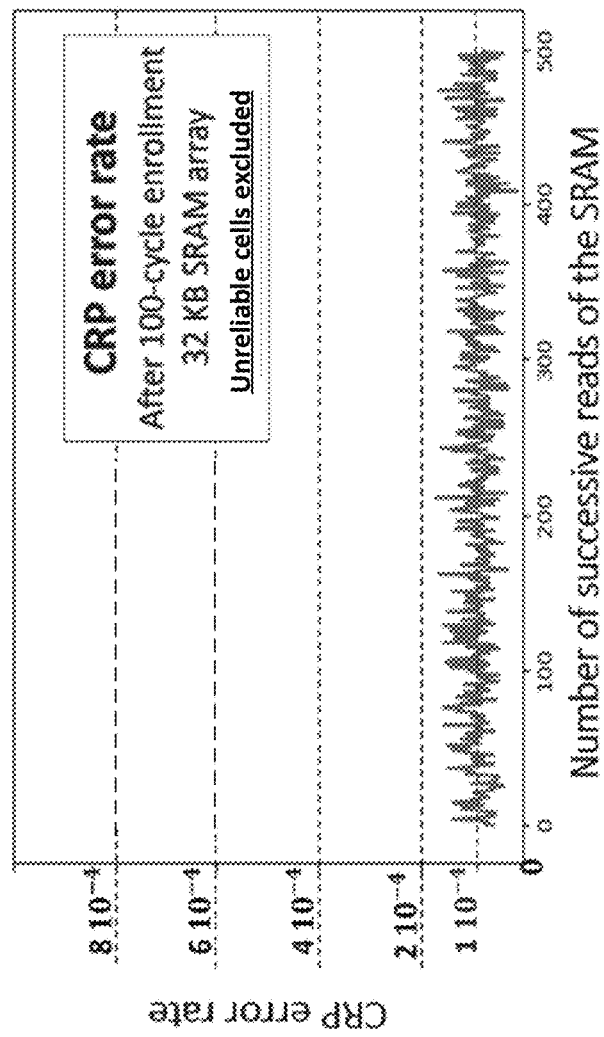

FIG. 2A shows results of performing the ternary masking procedure described above wherein unreliable cells are excluded from the response generation process as a function of the number of repeated measurements. As the number of measurements increases the likelihood of correctly identifying unreliable cells increases and eventually approaches a saturation point. For example, when fewer than 7 measurements were performed on each cell during enrollment, between 0% and 6% of the cells were identified as unreliable and the corresponding CRP error rates were between 3% and 5%. Meanwhile when approximately 100 repeated measurements were performed during enrollment, approximately 11% of the cells were identified as unreliable and the corresponding CRP error rates fell below 0.03%. FIG. 2B shows CRP error rates of a 32 kB SRAM array used as a PUF. 100 enrollments were performed and the unreliable cells were excluded (or "masked") as described above. The CRP error rates remained under 0.02% over a course of 500 successive reads.

Figure 2C:
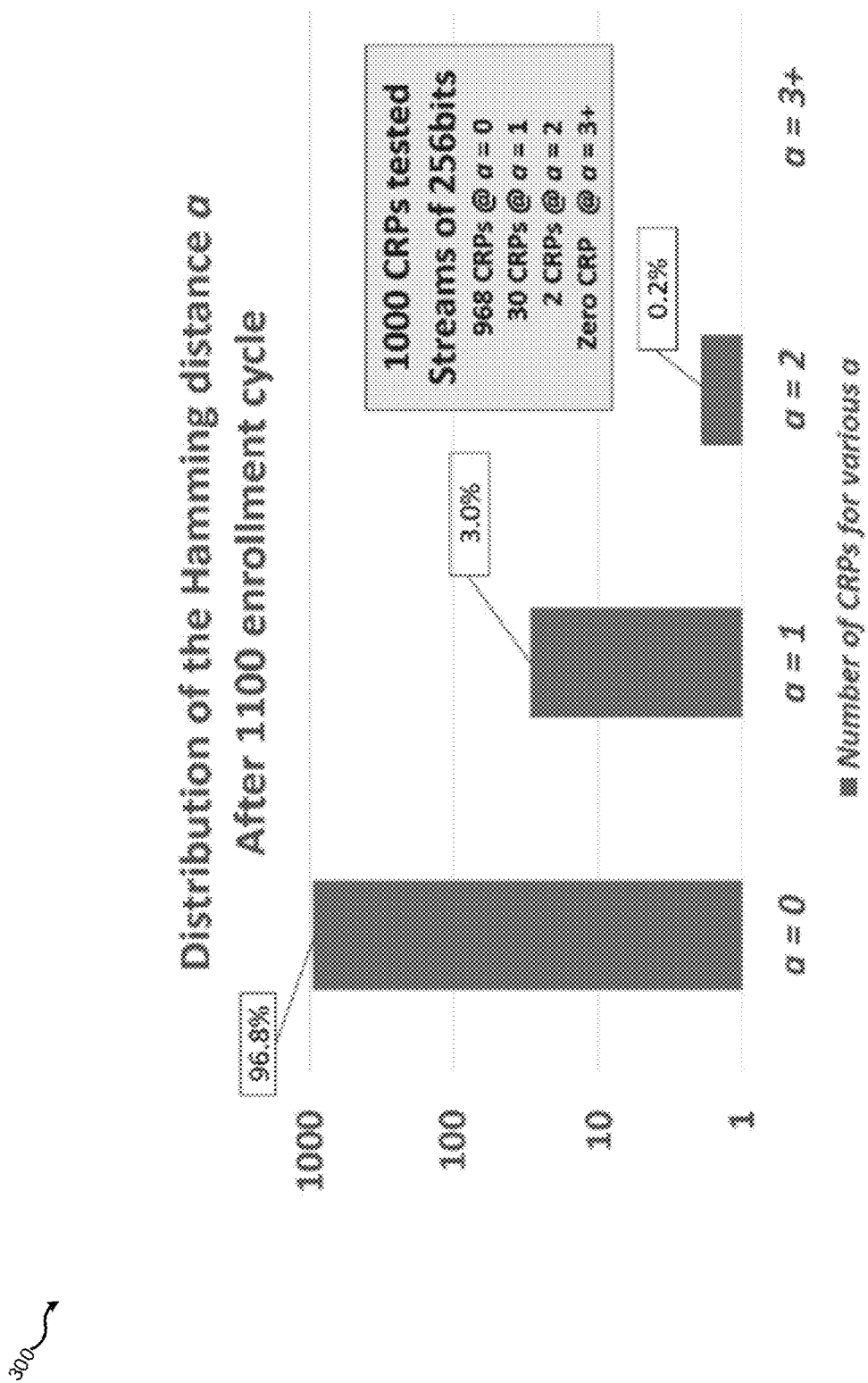

FIG. 2C shows a histogram 300 illustrating the results of characterizing CRP errors in an SRAM PUF in terms of the Hamming distances between the expected challenge responses and the responses generating using the SRAM PUF array when the cells were measured 1,100 times during enrollment. 1000 challenge-response pairs were generated. Of those 1000 challenge response pairs, 96.8% of responses matched the expected response (Hamming distance of zero), 3% had a Hamming distance of one (indicating that $1/256$ cells generated an erroneous output), and 0.2% had a Hamming distance of two (indicating that $2/256$ cells generated an erroneous output). After 1000 trials, no challenge response pairs exhibit Hamming distances greater than two from the expected response. The use of ternary PUFs drastically reduces the error rate, thereby facilitating the task of the error-correcting methods.

Another approach dealing with non-zero CRP error rates for encryption-key-generation referred to herein as "response-based-cryptography" or "RBC." RBC may be used independently, or in conjunction with error correction instructions other error-mitigation schemes such as ternary PUF schemes described later below to realize improved performance. When used with ternary PUF schemes, effective error rates below the level of $10^{-8}$ may be realized. Furthermore, comparable CRP error rates can be achieved by combining binary PUF error-correction methods capable of achieving CRP rates on the order of $10^{-3}$ on their own with RBC.

Figure 3:
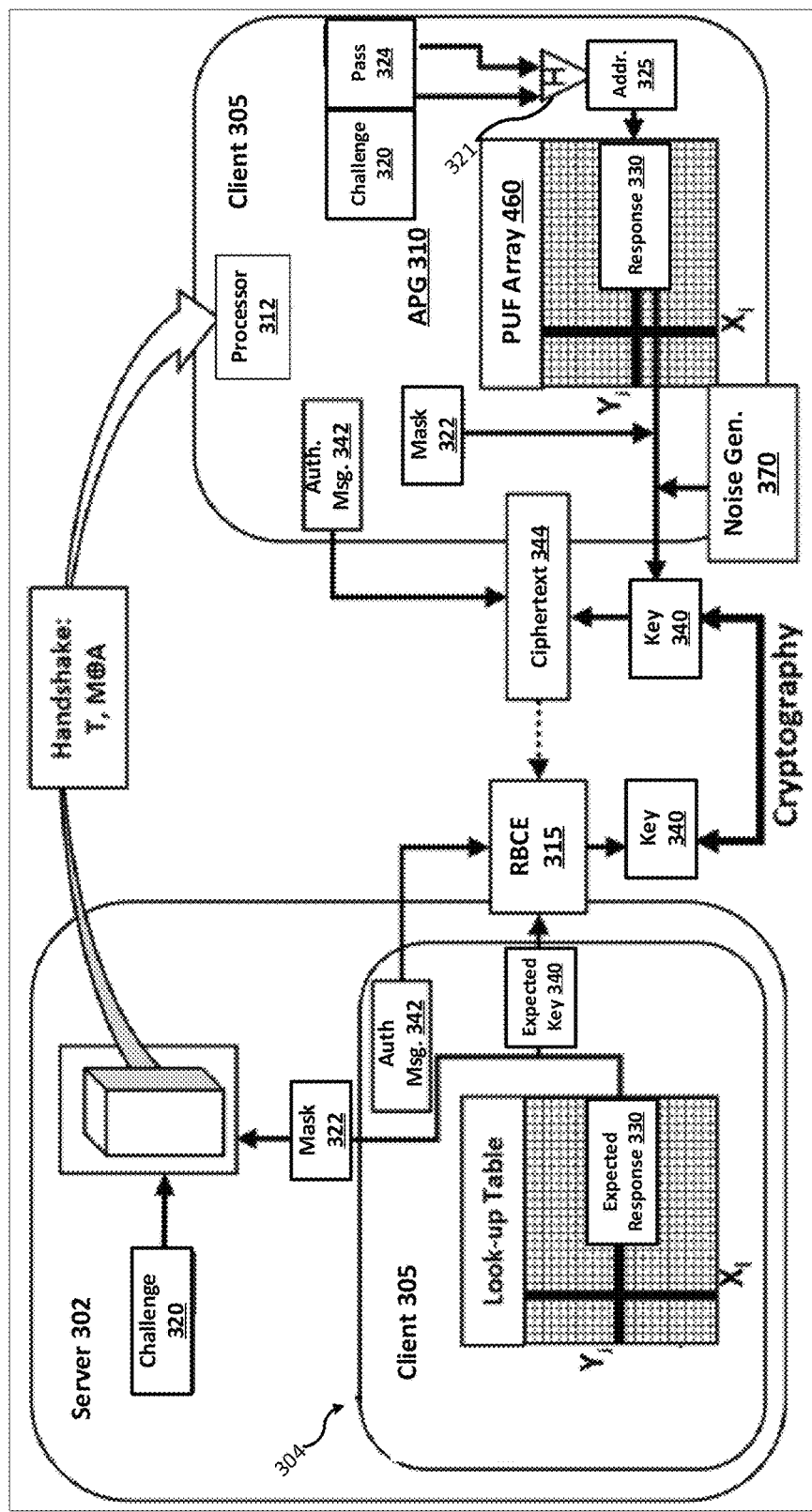
FIG. 3 is a block diagram illustrating a system and method according to an embodiment related to the embodiment of FIG. 1 for authentication and secure communication using challenge-response authentication between a server have a response-based cryptography engine (RBCE) disclosed herein and a client device having an addressable PUF generator (APG) which includes a noise generator.

FIG. 3 illustrates and embodiment 300 where a server 302 includes a response-based-cryptography (RBC) engine (RBCE 315). Analogously to the server 102 of embodiment 100, the server 302 of embodiment 300 stores initial responses 330 for APGs 310 of clients 124 having PUF arrays 360 in a database 304. The server 302 receives keys 340 generated by clients 305 using APGs 310. However, in embodiment 300, error correction instructions (e.g., the error correction instructions 124a of embodiment 100) are not required because the server 302 is provided with the RBCE 315. The purpose of the RBCE 315, is to identify responses 330 from the initial responses 330 which produce encryption keys 340 which the encryption keys 340 generated by clients 305 when the client-generated responses 330 are consistent with the expected responses 330 to particular challenges 320 issued by the server 302.

When the server 302 uses the RBCE 315 used for authentication and secure communication with a client 305, the server 302 issues an authentication challenge 320 to the client 305. The client 305 uses an APG 310 to generate a response to the authentication challenge 320 using its PUF array 360. The client 305 generates an encryption key 340 using the response 330. The client 305 then encrypts an authentication message 342 using the key 440 to produce a ciphertext 344. The server 302 uses the RBC engine 315 to independently encrypt the authentication message 342 using the initial response 330 to independently generated the ciphertext 344. If both ciphertexts match, the server 302 knows that it has successfully generated the same encryption key 340 and that the client 305 may be authenticated. In some embodiments, the server 302, rather than independently generating the ciphertext 344, may instead decrypt the ciphertext 344 received from the client 305 and verify that resulting plaintext is the expected authentication message 342 for the client 305. If the ciphertexts (or alternatively, plaintext the authentication messages 342) do not match, the RBC engine 315 may perform additional steps to determine that that they are nevertheless consistent with each other, as described below. Non-limiting examples of acceptable authentications messages include a user ID of the client 305 or other identifying information such as a secret shared by the client 305 and the server 302. In some embodiments, the client 305 and the server 302 may have access to a shared random number generator (RNG) and the shared secret may be a random number generated by that RNG. In other embodiments, the client 305 and the server 305 may be provided with synchronized RNGs. In some embodiments, the server 305 may store the authentication message 342 directly, while in other embodiments, the server 305 may store information related to the authentication message 342 along with instructions for generating the authentication message 342.

Figure 4:
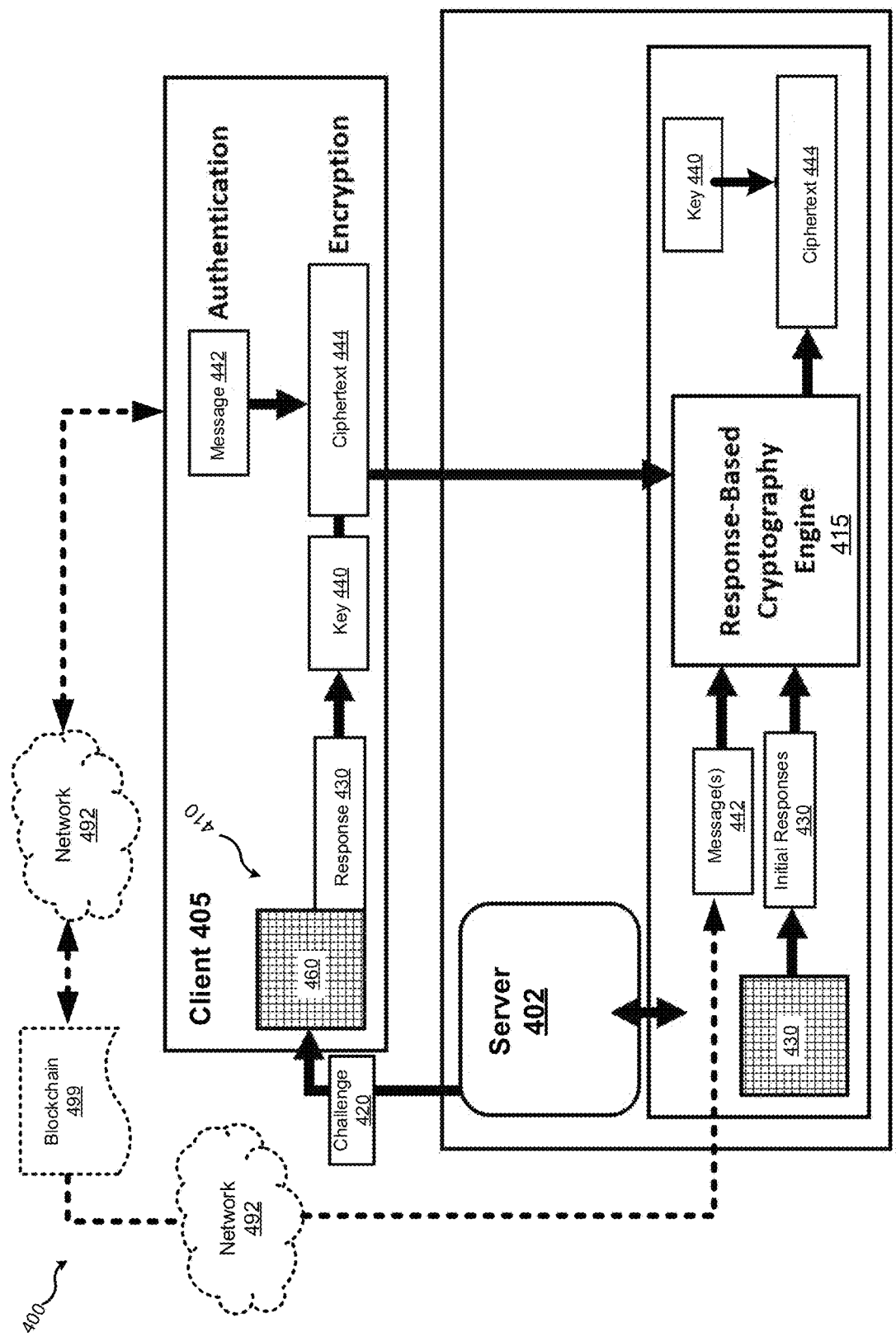
FIG. 4 is a block diagram depicting a procedure of authenticating a client in the embodiment of FIG. 3

FIG. 4 shows an example embodiment 400 in which a server 402 and a client 405 perform an example RBC authentication procedure. In embodiment 400, the server 402 issues an authentication challenge 422 to a client 405. The client 405 uses an APG 410 to generate a response to the authentication challenge 422 using its PUF array 460. The client 405 generates a an encryption key 440 using the response 430. The client 405 then encrypts an authentication message 442 using the key 440 to produce an ciphertext 444 (i.e., a ciphertext). The server 402 uses the RBC engine 415 to independently encrypt the authentication message 442 using the initial response 430 to independently generated the ciphertext 444. If both ciphertexts match, the server 402 knows that it has successfully generated the same encryption key 440 and that the client 405 may be authenticated. In some embodiments, the server 402, rather than independently generating the ciphertext 444, may instead decrypt the ciphertext 444 received from the client 405 and verify that resulting plaintext is the expected authentication message 442 for the client 405. If the ciphertexts (or alternatively, plaintext the authentication messages 442) do not match, the RBC engine 415 may perform additional steps to determine that that they are nevertheless consistent with each other, as described below. Non-limiting examples of acceptable authentications messages include a user ID of the client 405 or other identifying information such as a secret shared by the client 405 and the server 402. In some embodiments, the client 405 and the server 402 may have access to a shared random number generator (RNG) and the shared secret may be a random number generated by that RNG. In other embodiments, the client 405 and the server 405 may be provided with synchronized RNGs. In some embodiments, the server 405 may store the authentication message 442 directly, while in other embodiments, the server 405 may store information related to the authentication message 442 along with instructions for generating the authentication message 442.

In some embodiments, one or both of the server 402 and the client 405 may optionally retrieve the authentication message 442 over a network (e.g., the network 492 shown in FIG. 4) such as a WAN, LAN, or the Internet as non-limiting examples. Various types of information may be used as the authentication message 442. As a non-limiting example, the authentication message 442 may be a blockchain transaction or other block which may have been generated by the client 405 and/or cryptographically signed by the client 405 which identifies the client 405 to the server 402. In this example, the server 402 may optionally retrieve the authentication message 442 from the blockchain 499 as shown in the FIG. 4. Similarly, the client 405 may write information to the blockchain 499 (e.g., a signed transaction block) and later retrieve the authentication message 442 from the blockchain 499 during authentication with the client 402.

For instance, in some embodiments, the client 405 may send a message to the server 402 to authenticate using a transaction block from the blockchain 499 as the authentication message 442. In this instance, the server may retrieve the transaction block identified by the client 405 from the blockchain 499 as the expected authentication message 442 and verify that it identifies the client when processed using methods disclosed above and elsewhere in the present disclosure. In some embodiments, the client 402 may transmit a public encryption key, a cryptographic signature, or other cryptographic output associated with the client as the authentication message 442. A public encryption key may be a public key corresponding to a private key previously used by the client 405 to generate a cryptographically-signed transaction block in the blockchain 499. In embodiments in which the client transmits a message explicitly identifying the corresponding transaction block in the blockchain 499, the sever 402 may access blockchain data of the blockchain 499 over the network 492 in order to retrieve a copy of the corresponding transaction block, public encryption key, cryptographic signature, and/or other cryptographic output from the blockchain 499 and determine that the client 405 may be authenticated as disclosed herein.

In some embodiments where the client 405 uses a public encryption key as the authentication message 442, the server may verify that the public key is associated with an authentic client 405 by a digital signature authority (DSA) by requesting validation of the public from the DSA via the network 492. In some embodiments, the server 405 may itself function as a DSA. In some embodiments the client 405 may transmit a message to the server 402 indicating a particular transaction block in the blockchain 499, signed with an encryption key in response to the challenge 422. The server 402 may use an asymmetric key generation algorithm to verify that that encryption key is a public key corresponding to a private key a generated from the challenge response stored by the server 402 in accordance with an asymmetric cryptographic scheme (e.g., RSA, elliptic curve cryptographic schemes, lattice cartographic schemes, multivariate cryptographic schemes, code-based cryptographic schemes, or another suitable asymmetric cryptographic scheme). In some embodiments, the client 405 may identify a transaction block signed by the client 405 prior to authentication along with a particular challenge 422 which the client 405 previously used to produce an encryption key with which the transaction block was signed by the client 405 as disclosed previously above. In such embodiments, the sever 402 may independently derive an encryption key using the initial response 430 corresponding to that challenge 422 and determine that the client is authentic using methods previously disclosed herein.

Because server 402 does not need to generate and transmit helper messages in embodiments described above, and the clients 405 do not need to have error-correcting schemes to correct the errors in the responses 430, the computing power needed at the client level in such embodiments is reduced, which allows the use of less powerful microcontrollers, smaller memory components, and simpler architectures. The elimination of the need for helper instructions (e.g., the error correction instructions 122a) also simplifies communication between servers and clients. The latency at the client device is significantly reduced, giving less time for malicious observers to extract relevant information from transactions.

Figure 5:
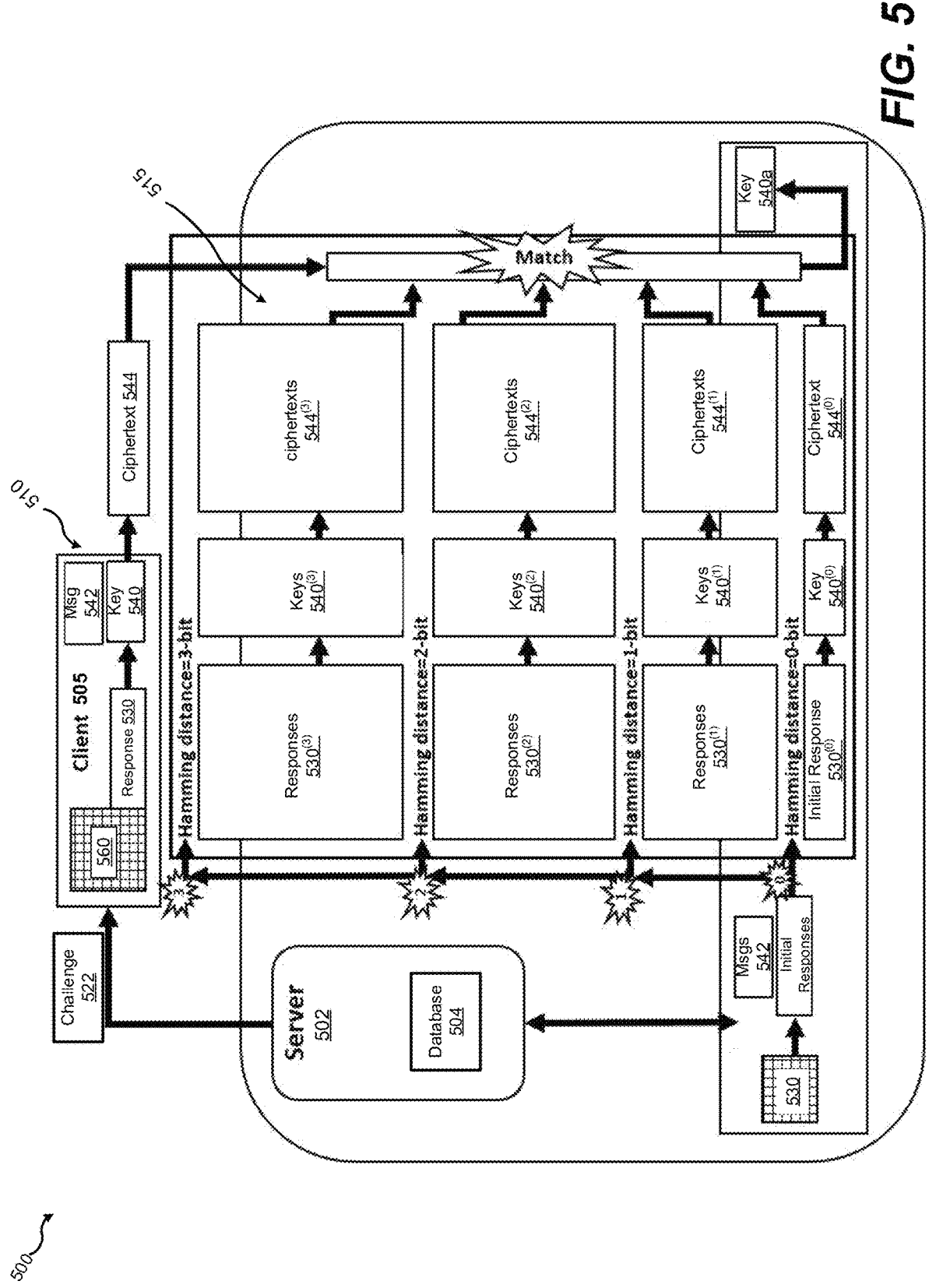
FIG. 5 is a block diagram depicting further details of the authentication procedure of FIG. 4 in some embodiments.

FIG. 5 shows details of an embodiment 500 wherein a server 502 uses an RBCE 515 (e.g., the RBCE 315) to authenticate a client 505 (and also agree upon an encryption key with the client) when the CRP error rate of an APG 510 with a PUF array 560 is non-zero. During Authentication, the client 505 receives the challenge 522 from the server 502. The server 502 stores initial responses 530 generating during enrollment in a database 504. The client 505 generates an encryption key 540 (e.g., using the challenge 522/response 530) and encrypts an authentication message 542 with the encryption key 540 to produce the ciphertext 544 and transmits it to the server 502 which uses the RBCE 515 to authenticate the client 505 and generate a matching encryption key 540. The server 502 may use the RBCE 515 to encrypt the same authentication message 542 with one or more encryption keys derived from expected response to the challenge 522 stored in the initial responses 530 for use in determining same encryption key 540 as the client 505. If encrypting the authentication message 542 with one of the server-generated encryption keys reproduces the client-generated ciphertext 544, the server may use that key to encrypt further communications with the client 505.

For example, the RBCE may use the expected response 530 (denoted initial response $530^{(O)}$) to indicate a Hamming distance of zero from the corresponding initial response 530 to generate an expected key 540 (denoted by key $540^{(O)}$) and encrypt the authentication message 542 with the key $540^{(O)}$ to produce an expected ciphertext 544 (denoted by ciphertext $544^{(O)}$. In order to account for possible CRP errors at the client 505, the RBCE 515 may generate additional responses with various Hamming distance from the expected response 530, derive additional keys 540 from those responses and produce additional ciphertext 544. For example, the RBCE 515 may generate a set of responses $530^{(1)}$ having a Hamming distance of one from the expected response 530, generate corresponding encryption keys $540^{(1)}$, and encrypt the authentication message 542 with each of those keys to produce corresponding ciphertext $544^{(1)}$. The RBCE 515 may also similarly generate ciphertext $544^{(2)}$ and $544^{(3)}$ from the authentication message 542 and the respective responses $530^{(2)}$ and $530^{(3)}$ which are sets of responses which differ from the expected response 530 by Hamming distances of two and three, respectively. In some embodiments, the RBCE 515 may be configured to produce additional ciphertexts as described above using responses which differ from the expected response 530 by even greater Hamming distances. In some embodiments, the server 502, rather than independently generating one or more ciphertexts, may instead decrypt the ciphertext 544 received from the client 505 and verify that resulting plaintext is the expected authentication message 542 for the client 505. In other embodiments, the server 502 may compute additional ciphertexts before receiving the client-generated ciphertext 544, thereby lowering latency of the Authentication phase. In some such embodiments, the additional responses may be pre-computed and stored by the server at any time after the Enrollment phase.

In some embodiments, a client 505 may transmit a public encryption key to the server 502 instead of an encrypted authentication message 542 (e.g., a ciphertext 544). The public encryption key may be generated by the client 505 using the encryption key 540 as a private-key input to an asymmetric key generation algorithm, resulting in a private/public key pair according to an acceptable asymmetric encryption scheme. The server 502 may then independently generate such a public key using expected responses derived from the initial responses 530 generated during Enrollment. Non-limiting examples of acceptable asymmetric encryption schemes for include RSA, Elliptic Curve Cryptography (ECC), lattice cryptography schemes, code-based cryptography schemes, multivariate cryptography, and others.

Figure 6:
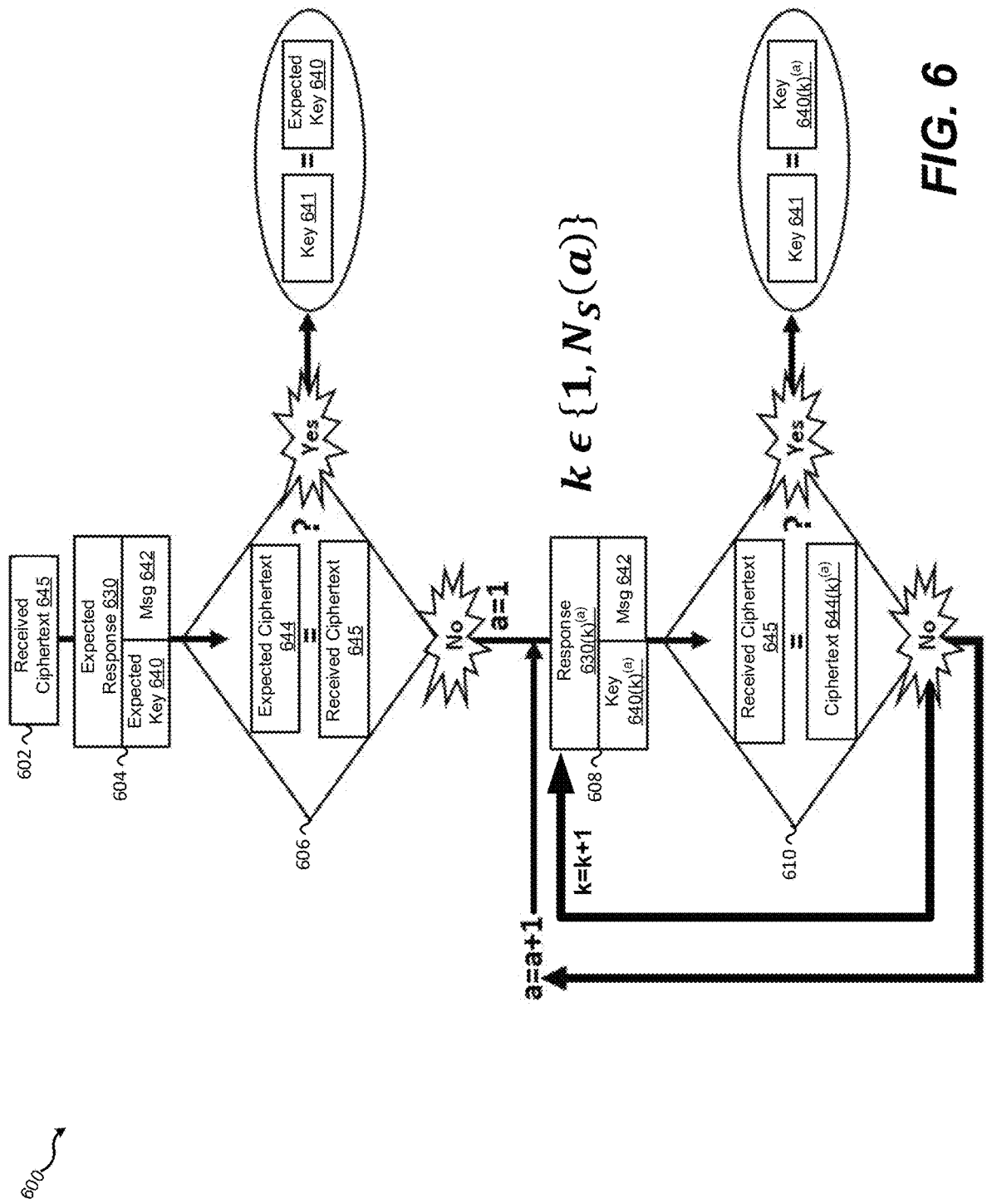
FIG. 6 is a flow diagram illustrating the authentication procedure of FIG. 5

FIG. 6 depicts an example response-based cryptography procedure 600 which may be performed by a system (e.g., the server 502 with RBCE 515). At step 602 the system receives a ciphertext 645 generated by a client (e.g., the client 505) using an encryption key 641 derived from a response to a challenge issued to the client. At step 604 the system encrypts an authentication message 642 with an expected encryption key 640 derived from an expected response 630 to the challenge to produce an expected ciphertext 644. At step 606 the system determines whether the expected ciphertext 644 is identical to the received ciphertext 645. If so, the expected key 640 must be the same as the client-generated key 641 and the plaintext of the ciphertext must be the same as the authentication message 642. The system may therefore determine that the client is authenticated and continue to communicate with the client using the encryption key 641.

If the received ciphertext 645 differs from the expected ciphertext 644, the system may proceed to step 608. At step 608 the system retrieves one of k possible ciphertexts $644(k)^{(a)}$ generated by encrypting the authentication message 642 with a corresponding encryption key $640(k)^{(a)}$ derived from one of k responses $630(k)^{(a)}$ having a Hamming distance of a from the expected response 630. The system begins with a=1 and proceeds to determine whether the first ciphertext $644(k)^{(a)}$ (i.e., a ciphertext $644(1)^{(1)}$) is identical to the expected ciphertext 645. If so, the corresponding encryption key (i.e., $640(1)^{(1)}$) must be the same as the client-generated key 641 and the plaintext of the ciphertext must be the same as the authentication message 642 and may therefore determine that the client is authenticated and continue to communicate with the client using the encryption key 641. If the two ciphertexts are not identical, the system increments the value of k and repeats steps 608 and 610 until a match has been found or until all possibilities up to k=$N_s$(a) with a=1 have been tried, where $N_s$(a) is the number of unique strings having a Hamming distance of exactly one from the expected response 630. If no matches are found, the system increments the Hamming distance a and repeats steps 608 and 610 until a match is found or all possibilities are exhausted up to a predetermined threshold value of the Hamming distance a. In some embodiments the maximum Hamming distance may be specified by a user. In some embodiments, the system may determine the maximum Hamming distance to meet specified constraints such as a maximum amount of time allotted for completion of the procedure 600 or a maximum consumption of computing resources allowed, as non-limiting examples.

If the computing power of the server device is effectively unlimited, the authentication procedure 600 may iterate with increasing Hamming distance until a matching ciphertext (and thus a matching encryption key) is identified, up to a predetermined maximum allowable Hamming distance. In such cases, the computing burden is placed on almost entirely on the system (e.g., the server 502). However, infinite computing power does not exist; therefore the above systems and methods may be limited to PUFs with CRP error rates that are low enough and have small Hamming distances between challenges and responses. The trade-off computing power at various levels of PUF quality is described below in connection to FIG. 7 and FIGS. 8A-C.

Notably, in some embodiments, if the server 502 expects a certain minimum number of errors in a response 530 or expects that a response 530 has a number of errors within a certain range, the computational requirements for matching may be reduced without reducing the computational complexity of determining the correct response 530 to the corresponding challenge 520 or an encryption key determined by the methods disclosed herein for an attacker (who does not know how many errors are contained in the response 530). For example, if the server 502 knows (or expects) at least three errors in a response 530, the server 502 can skip checking for an exact match or a match with Hamming distances less than three. Similarly, if the server 502 knows (or expects) that the number of errors will be between three and seven, the server 502 only needs to search responses with Hamming distances between three and seven.

Conventional authentication and encryption approaches using PUFs have relied on balancing the computing power required of the communicating parties as well as minimizing the total computing power required. However, as disclosed herein, once error rates can be controlled, the intentional injection of noise into PUF-based and other systems may be exploited to increase the entropy of ciphertexts exchanged over insecure channels and may improve the security of PUF-based and other encryption schemes. Embodiments disclosed herein create large asymmetries in the required computational power for servers (e.g., servers 102, 302) and clients (e.g., clients 105, 305) using controlled noise injection as described further below. This noise injection can be increased to prevent an attacker from effectively impersonating a legitimate server during a man-in-the-middle attack, for example. Large institutions such as governments or large corporations own high performance computers (HPC) while the number of hackers with HPC is small and often known by intelligence agencies. Conversely, the noise injection can be reduced or eliminated when the client and server are known to be communicating securely (e.g., within a secured facility or over an independently secured network). The ability to control the level of noise allows the computational cost associated with the RBC matching algorithm to be selectively raised or lowered as desired according to operational requirements and varying operational scenarios.

For convenience and ease of understanding, references are made below to characteristic levels of computing performance for different classes of computing devices to illustrate computing resources required to implement embodiments disclosed herein and estimate latencies and other parameters. A representative low-performance client device ("LPC") for these purposes has a mainstream 64-bit RISC processor running at ~1 GHz. A representative server for these purposes has thirty-two 64-bit quad-core microprocessors running at ~4 GHz. Meanwhile, a representative high-performance computer ("HPC," sometimes referred to as a supercomputer) has two-thousand-four-hundred (2,400) 64-bit quad-core microprocessors operating at ~4 GHz interconnected in parallel. It should be understood that nothing herein is intended to limit the practice of embodiments herein to such performance classes and that the such practice may be adjusted to future changes in relative performance levels of various computing devices by design choices described herein such as the length of challenge-response pairs, levels of noise injection, and so on. Additionally, it should be understood that various performance levels mentioned can be realized with FPGAs, custom ASICs, and nonconventional HPC systems such as those using arrays of GPUs or other specialized hardware. A desirable feature of embodiments herein is the ability to choose error levels in the challenge responses which ensure an acceptable level of asymmetry in the computational resources required to generate the responses versus computational resources required to verify responses.

The inventors have performed experimental verification of the noise injection methods described below which are non-limiting examples of embodiments disclosed herein. Other non-limiting examples include embodiments which employ noisy electronics during generation, transmission, and/or reception of the information during key exchange. The noise can be filtered or amplified to modify the level of noise injection.

Figure 7:
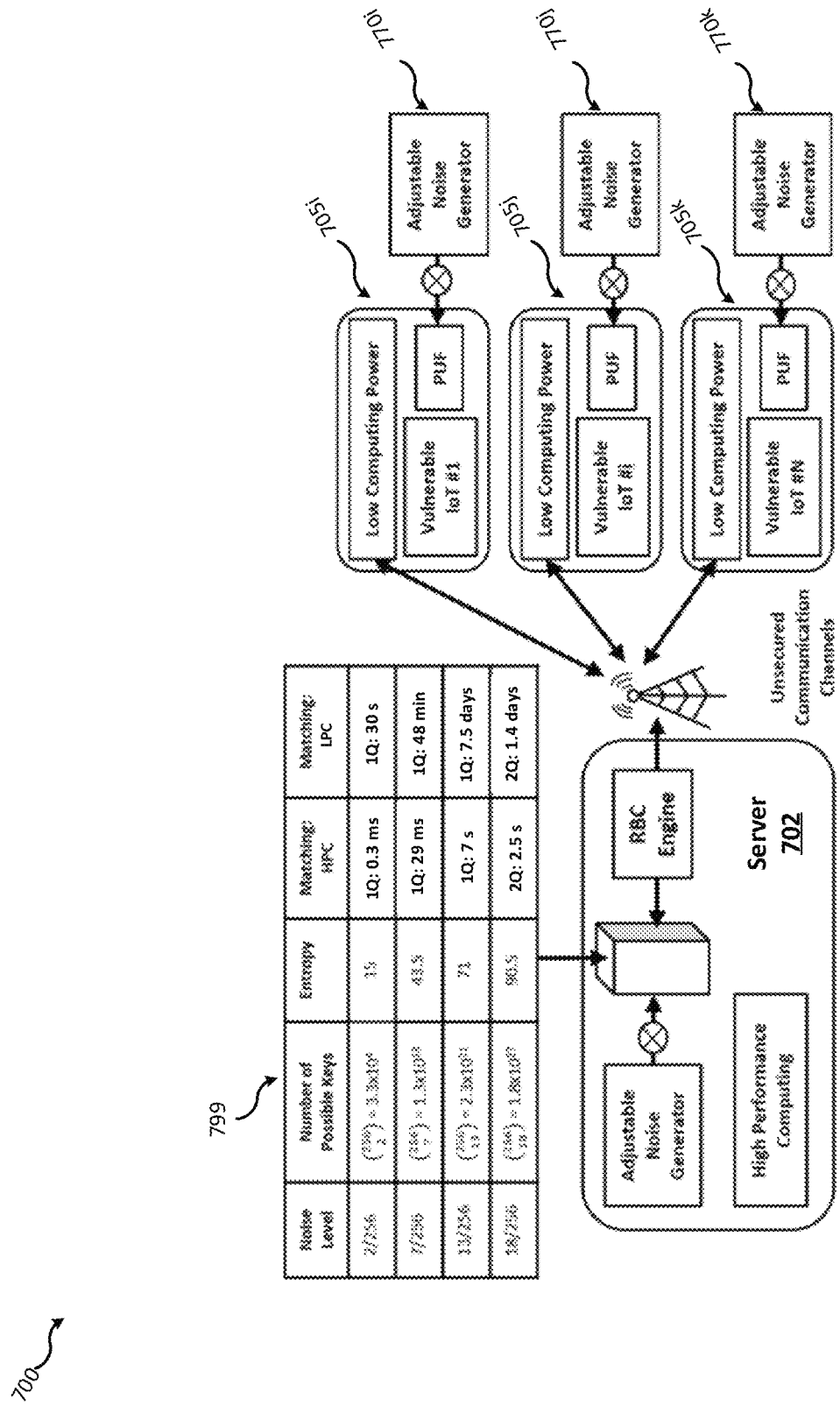
FIG. 7 is a block-level diagram illustrating an environment in which a server with an RBCE engine interacts with multiple client devices have APGs with noise adjustable noise generators.

FIG. 7 shows an example environment 700 in which a server 702 interacts with multiple clients 705 (represented by the clients 705$i,j,k$). Each client 705 has a noise generator 770 included within its APG 710. After a challenge response (e.g., challenge responses 130, 330) is generated, the client 705 may use the noise generator 770 of the APG 710 to randomly select a bits from the response and flip those bits (i.e., replace '0' with '1' and '1' with '0'). Although PUF arrays may produce spontaneous errors, noise generators 770 may be used to ensure that a challenge response has, on average, approximately a bit errors. The noise generator 770 of each client 705 may be configured to introduce a preconfigured number of errors, or the client 705 may issue instructions specifying the desired level of noise to the APG 770 (e.g., via a processor of the APG 770 such as the processor 112 or 312.). The instructions may originate from a user of the client 705, or from the server 702.

The intrinsic error rate of a given PUF array can be used to estimate computing resources required to determine that a response containing errors is originates from an authentic client 705 under different levels of noise injection. For example, in the experiments described by FIGS. 2A-C, about 3% of the 256-bit challenge response streams generated with an SRAM-based PUF contained errors when the SRAM PUF was enrolled using 1,100 repeated measurements for each cell and unreliable cells were excluded. If the same responses are subject to 5 bits are injected by the noise generator in the 256-bit keys, the RBC engine with HPC needs 0.4 seconds to match it; however, the false reject rate (FRR) is then 3% due to the errors created by the PUF, which is high. The FRR can be reduced by increasing the authentication cycle to 17 seconds and by allowing a 6-bit mismatch. The FRR is then reduced to an acceptable 0.2%, while both regular servers and PCs are precluded to participate because they are not powerful enough to process the key exchange within a 30-second cutoff.

The injection of erratic bits can be driven from the server by modifying the mask sent to the client devices during handshake. As shown in FIG. 2A, if the number of power cycles measured during enrollment of an SRAM-based PUF described above is low enough, unreliable cells may not be correctly detected and masked, resulting in higher CRP error rates. During Enrollment, the server can generate and store mappings of the ternary states of the SRAM PUF cells unreliable values. To inject a errors, the server may generate a mask which intentionally includes a suitable number of unreliable cells such that the desired number of errors in the challenge response is likely.

If the native error characteristics of a particular PUF array are known (or a class of PUF devices to which a particular array belongs), the Enrollment procedure may be used to determine an overall error rate by exploiting the fact that the confidence with which cells are deemed reliable or unreliable is a product of sampling statistics. For example, using a 4-cycle enrollment process and the SRAM PUF described above and excluding cells deemed unreliable based on 4 measurements, resulted in 256-bit challenge response streams with an average of 5 erroneous bit values (i.e., $a=5$); using a 10-cycle enrollment process cycles resulted in 256-bit streams with an average of 3 erratic bit values (i.e., $a=3$); and using a 100-cycle process resulted in 256-bit streams with an average of only 1 erratic bit value (i.e., $a=1$). As demonstrated, in some embodiments, the use of a small number of measurements of each PUF device belonging to a PUF array (e.g., a PUF array 160 or 360) during enrollment may be used to achieve similar outcomes to clients supplied with dedicated noise generators (e.g., the noise generators 370, 770)

The inset table 799 of FIG. 7 illustrates the computing resources needed to establish a secure communication with the RBC increases with higher noise levels. For example, with 13 erratic bits over 256-bit keys, high performance computers (HPC) need only 7 seconds in one cycle to establish the communication, while a device with LPC-level performance needs more than one week. Thus, existing response-based cryptographic (RBC) schemes are good enough to support secure communications with ternary PUF categorization schemes such as those described above; however, such schemes do not readily support noise injection greater than 5-bits for 256-bit keys due to the large number of permutations which may need to be tested to find a match. Described below is a novel method to increase the capability of the RBC to more rapidly recognize keys with higher levels of noise. This allows for the injection of much higher numbers of erratic bits, which further increases the inequality between the server and client device in terms of the needs of computing power.

Existing RBC methodologies that do not rely upon HPC-level performance for the server are limited to noise injection of 5 to 7 bits when using 256-bit response streams. At higher error rates, even powerful HPCs are unable to perform the validation of the key exchange in reasonable time. For example, it will take an HPC five hours to confirm an 8-bit mismatch, which is not acceptable for most applications. This is because the number of possible 256-bit strings with a Hamming distance $a=8$ from a known 256-bit string is $$N_8 = \binom{256}{8} = 4 \times 10^{14}. \quad \text{(Eq. 2)}$$

The number of possible 256-bit strings with a Hamming distance $$a = 40, N_{40} = \binom{256}{40} = 1 \times 10^{47}. \quad \text{(Eq. 3)}$$

The ratio $N_{40}$ to $N_8$ is equal to $2.5 \times 10^{36}$, which represents an enhancement of the entropy from 48 for an 8-bit mismatch to 157 for a 40-bit mismatch.

One approach to allow for higher error rates without making matching overly burdensome may include restricting errors to one or more specific locations in the response stream. For example, if N errors are injected into a 256-bit response the matching process may be made less burdensome if the errors are restricted to a block of 64 bits in a location known by the server and the client. This is because the server needs to only check $$\binom{64}{5}$$

permutations rather than $$\binom{256}{5}$$

because the remaining 192 bits are known to be error-free. In some embodiments, the location of the erratic bits may be randomly chosen in a manner which allows the client and the server to agree on which bits will be erratic (by accessing a shared random number generator and using a random number to determine the location of the erratic bits for example). It will be understood that other methods may be used to increase the long-term entropy of the responses when using such techniques to vary the location of erratic bits in the responses. As a non-limiting example, the client and server may share a set of strings, each string specifying an arrangement of erratic bits. In this example, the client and server may be configured to rotate through the set of strings in an algorithmically-determined pseudo-random sequence or other sequence. In some such embodiments, the client may be configured to implement error correction procedures to ensure that the intended erratic bits are the only errors in the responses.

To address the potential intractability of RBC-based matching when responses may have large Hamming distances from the expected response, we have also designed a scheme based on the segmentation of 256-bit response streams into multiple sub-streams. These sub-streams may be augmented with known data streams that are shared with the server to form 256-bit sub-keys. Each of 256-bit sub-keys are then used to encrypt an authentication message (e.g., an authentication message 542, 642) with a method such as AES. The ciphers are transmitted to the RBCE (e.g., one of the RBCEs 315, 415, 515) of the server, which finally validates the key exchange. The validation of several sub-keys is much faster than validating a single key, as demonstrated below.

Specifically, in embodiments using segmented responses, the client may segment the response into N segments. For a 256 bit response, this results in four 64-bit response segments. These segments may be used as encryption keys using methods described herein. These keys may be used to encrypt the expected authentication message into four ciphertexts as described herein. To improve security (i.e., by mitigating the susceptibility of short keys to brute force attacks), each 64 bit response segment may be augmented by an additional nonce value with a length sufficient to produce an acceptable long key. For instance, a 192-bit nonce string may be added to a 64-bit response segment to yield a 256-bit key. The nonce values may be transmitted by the server during authentication (e.g., as part of the masking instructions) or otherwise shared by the server and the client. In one non-limiting example, the client and server may have access to a shared random number generator.

In some embodiments, the client is preconfigured to perform key segmentation and the server is similarly preconfigured to verify segmented responses produced by clients. In other embodiments, the server may be configured to transmit segmentation instructions along with the challenge that instruct a client device to perform key segmentation as described herein. As a non-limiting example, instructions accompanying or included in the challenge may instruct the client to generate four 256-bit keys, each 256-bit key containing a 64-bit response segment derived from a 256-bit response stream. In other embodiments, the client may determine whether to perform key segmentation and transmit information to the server indicating that the client has performed or will perform key segmentation as described above.

When the 256-bit keys are segmented into two 128-bit sub-keys that are augmented with error-free shared data (or an error-free response segment), the RBC engine is faster for the multiple reasons. First, for similar error rates, the Hamming distance a between each response segment and the expected response segmented is halved. For example if the error rate is 3.12%, then a=8 for an unsegmented 256-bit key but a=4 for each 128-bit sub-key. Secondly, it be appreciated by comparing FIG. 8A to FIG. 8B, that the matching time for the same Hamming distance a is considerably smaller for 128-bit keys compared with 256-bit keys. For example with an HPC and a=8, it takes five hours to validate a 256-bit key and 1.1 minutes to validate a 128-bit key. Additionally, the time needed to validate a errors of a 256-bit stream is proportional to $$T_{256} = t_0 \binom{256}{a} \quad \text{(Eq. 4)}$$

where $t_0$ is the time needed to encrypt the authentication message with AES and to compare it to the cipher transmitted by the client device, and a is an even number. The time needed to validate a/2 errors of a 128-bit key, which has the same error rate as a errors for a 256-bit key, is proportional to $$T_{128} = t_0 \binom{128}{a/2}. \quad \text{(Eq. 5)}$$

The ratio between $T_{256}$ and $T_{128}$ is $$T_{256}/T_{128} = \frac{\binom{256}{a}}{\binom{128}{a/2}} = \left[\frac{(256!)\left(\left(128-\frac{a}{2}\right)!\right)\left(\left(\frac{a}{2}\right)!\right)}{(a!)((256-a)!)(128!)}\right]. \quad \text{(Eq. 6)}$$

For example, if a=8, then $$T_{256}/T_{128} = \frac{\binom{256}{8}}{\binom{128}{4}} = \left[\frac{(256!)(124!)(4!)}{(8!)(248!)(128!)}\right] = 1.9 \times 10^7.$$

When 256-bit response streams are segmented into four 64-bit sub-keys augmented with error-free shared data streams or nonce strings the RBC matching process is faster for the following reasons. First, for similar error rates, the Hamming distance (a) between challenge and response is ¼. For example if the error rate is 3.12%, then a=8 for 256-bit key and a=2 for 64-bit key. Secondly, the matching time for the same value of a is considerably smaller for 64-bit keys compared to 256-bit keys. For example, when a=8, it will take an HPC approximately five hours to validate a 256-bit key but only 200 ms to validate a 64-bit key. Generally, if the time required to find a match to a 256-bit key with a Hamming distance a from the expected key is $t_0$, then the time needed to find a match for a 64-bit key with the same Hamming distance a from the expected key $T_{64}$ is related to $t_0$ by the expression $$T_{64} = t_0 \binom{64}{a/4}. \quad \text{(Eq. 7)}$$

The ratio between $T_{256}$ and $T_{64}$ is given by $$T_{256}/T_{64} = \frac{\binom{256}{a}}{\binom{64}{a/6}} = \left[\frac{(256!)\left(\left(64-\frac{a}{4}\right)!\right)\left(\left(\frac{a}{4}\right)!\right)}{(a!)((256-a)!)(64!)}\right]. \quad \text{(Eq. 8)}$$

For example, if a=8, then $$T_{256}/T_{64} = \frac{\binom{256}{8}}{\binom{64}{2}} = \left[\frac{(256!)(62!)(2!)}{(8!)(248!)(64!)}\right]5.1 \times 10^{10}$$

The injection of much higher levels of noise is practical when a key has been fragmented in sub-keys. For example, the injection of 40 erratic bits, which represents 15.625% of a 256-bit key, can be validated in only 4×6.6 seconds with an HPC when fragmented in 64-bit chunks. This is totally out of reach when the 256-bit keys are not fragmented.

The modification of the RBC as presented above can be generalized with a fragmentation into pieces of smaller sizes to be able to increase the noise injection to a higher level. The fragmentation can also be used as an alternative way to enhance the computing power asymmetry between server and client devices. As part of the handshake, the server can command a reduction or an increase of the fragmentation in sub-keys. In hostile environments, the noise injection can be stronger concurrently with higher sub-key fragmentation. The client device can unilaterally increase the sub-key fragmentation to allow the use of stronger noise injections.

In order to experimentally assess this novel protocol, a prototype was built using an SRAM PUF and AES cryptography. The results of the analysis are summarized and shown in FIGS. 8A-C. The left column of the figure shows the CRP error (as a percentage) for 256-bit keys and 64-bit sub-keys.

FIG. 8A shows a table 800A which lists the number of unique bitstreams having a Hamming distance a from a given 256-bit bitstream. In order to demonstrate the practicality of RBC, we estimate how much time is needed to generate all response streams (e.g., the k responses $630(k)^{(a)}$ for all values of k in the interval $\{1, N_s(a)\}$ with the Hamming distance a, use them to use them to generate encryption keys, and to encrypt a message (e.g., the authentication message 642) for the purpose of matching ciphertexts as in procedure 600. If we assume that the response is 256-bit bitstream, the number of possible streams, $N_s(a)$=256-choose-a. Table 700 also shows the number of possible bitstreams along with time required using thirty-two 4-GHz quad-core 64-bit microprocessors (i.e., "server level" performance), as well as the time required using 2,400 4-GHz quad-core microprocessors (i.e., "HPC" performance).

FIG. 8B shows a table 800B which, analogously to table 800A lists the number of unique bitstreams having a Hamming distance a from a given 128-bit bitstream, which similarly provides estimated times needed to generate all response streams (e.g., the k responses $630(k)^{(a)}$ for all values of k in the interval $\{1, N_s(a)\}$. FIG. 8C shows a table 800C which, analogously to tables 800A,B lists the number of unique bitstreams having a Hamming distance a from a given 64-bit bitstream, which similarly provides estimated times needed to generate all response streams (e.g., the k responses $630(k)^{(a)}$ for all values of k in the interval $\{1, N_s(a)\}$.

In some instances, it may be more efficient for a server using RBC protocols described above to issue a new challenge in response to CRP errors, rather than continuing to search for matches based on additional responses with increasing Hamming distances from and expected response. Metrics related to such tradeoffs are summarized in FIG. 9A which shows a table 900A with columns 910, 920, and 930. Each row of the table 900A corresponds to an assumed CRP error-rate for a hypothetical APG implemented the methods disclosed herein. Column 910 summarizes the false rejection rate (FRR) expected for a particular combination of CRP error rate and acceptable Hamming distance, a. Each sub-column 910a-910e corresponds to a labeled value of a. For example, when the likelihood that any given bit in a 256-bit response will experience an error is 3%, there is a 98% likelihood that the response will differ by 2 or more bit values form the expected response (i.e., a 98% likelihood of 2 or more bit errors in a single response). The FRR for a given maximum acceptable Hamming distance may be reduced if the server is allowed to issue additional challenges ("queries") because the likelihood that of obtaining a low-error response increases with the number of queries. However, from a security standpoint, it is better to reduce the number of client-server interactions (i.e., reduce the number of queries) because each interaction exposes information about the authentication system which may be intercepted and could be used to identify exploits over time. At the same time, the authentication process should be as fast as possible.

Column 920 summarizes a number of attempts required to achieve an FRR of less than 0.1% for different labeled values of a (see sub-columns 920a-920e). For example, it is not feasible to achieve an FRR of less than 0.1% in an APG with a 3% CRP error rate when the maximum allowable Hamming distance is 5 bits or more because a prohibitively-large number of queries would be required. In fact, according to the test results presented, FRR<0.1% only becomes possible when the CRP rate is 1% and the maximum allowed Hamming distance is at least 4.

Column 930 presents latency estimates for key matching under different performance assumptions using AES encryption to generate the ciphertexts when other variables have been chosen to ensure the FRR is less than 0.1% subject to the constraint of one allowed query, two allowed queries, as well as the shortest possible latency using more than two queries when latencies are undesirably high even with two allowed queries for each authentication transaction (see sub-columns 930a-930b for matching latency estimates for PC-level performance and sub-columns 930d-930f for matching latency estimates for HPC-level performance). For example, when the CRP error rate is 0.3% the matching latency at FRR=0.1% is 11 hours at the "LPC" performance level if only one query is allowed, but the matching latency is only 400 ms at the "HPC" performance level. Entries marked "NA" indicate that the estimated latencies are impractically long.

FIG. 9B shows a table 900B which summarizing tradeoff metrics for 64-bit long responses, analogously to table 900A which summarizes the same metrics for 256-bit long responses. The columns 950, 960, and 970 of table 900B and their respective sub-columns correspond to the same tradeoff metrics as those in columns 910, 920, and 930 of table 900A for the error rates given in table 900B. The estimates in Table 900B demonstrate that fragmentation of 256-bit keys into four 64-bit segments as described herein works well for higher error rates.

It will be appreciated from the estimates in tables 900A,B that tuning the effective CRP error rates of APGs (e.g., APGs 160, 360) can be used to select the overall computational complexity of the matching algorithms disclosed herein and similar algorithms. In some embodiments a user may determine a level of computing power available to an potential attacker and cause client devices to inject greater levels of noise such that the matching process may be performed with acceptable latency on the server side while remaining impractical for a prospective attacker having access to less powerful computing resources.

Figure 10:
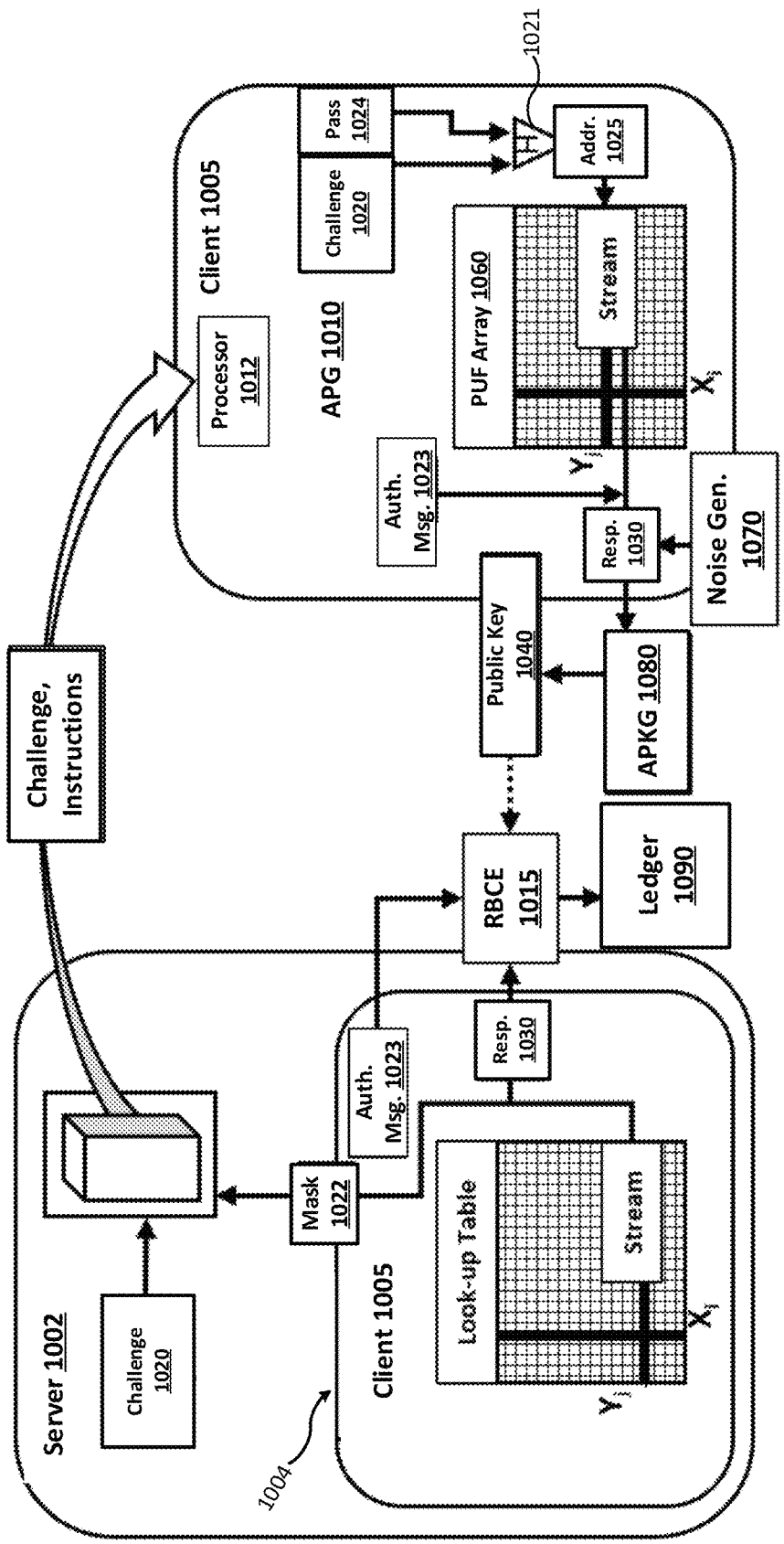
FIG. 10 is a block diagram illustrating an embodiment related to the embodiment of FIG. 3.

RBC-based architectures such as those described above can be applied to secure PKI networks, including digital signature schemes for blockchain technologies, as illustrated in FIG. 10. Rather than encrypting an authentication message with the private key generated from the PUF, as presented previously, the client device generates a public key that is openly shared with the PKI network. The server, with the RBC engine, independently validates the public key and posts it in a public ledger. The noise is injected to create a mismatch between the keys used by the client device and the ones generated by the ternary PUF; only servers equipped with powerful computing power can validate these keys. This architecture can also benefit from the fragmenting of the keys into sub-keys, which allows higher level of noise injection.

FIG. 10 illustrates an embodiment 1000 in which a server 1002 provided with a response-based cryptography engine (RBCE 1015) interacts with a client 1005 for authenticating and secure communication using RBC techniques disclosed herein. The server 1002 stores initial responses 1030 for the client 1005 generated during Enrollment in a database 1004. During authentication, the server 1002 issues a challenge 1020 to the client 1005. The server 1002 also transmits instructions such as the masking instructions 1022 (e.g., masking instructions 122b) to the client 1005. The client 1005 has an APG 1010 with a processor 1012 and a PUF array 1060. The client 1005 process the challenge 1020 with the processor 1012. In embodiment 1000, the processor 1012 optionally combines the challenge 1020 with a password 1024 (such as a password of a user of the client 1005) as inputs to a hashing function 1021 which may be any suitable hashing function. The resulting hash value is used as an address 1025 (or a range of addresses) which specifies a PUF device or range of PUF devices to measure belonging to the PUF array 1060. The resulting measurements are used to generate a response 1030 to the challenge 1020. The APG 1010 uses a noise generator 1070 to introduce errors into the response 1030. The response 1030 (with added noise) may be used as a private key input to an asymmetric public key generator (APKG 1080) to produce a cryptographic public key 1040 in accordance with an asymmetric encryption scheme (e.g., RSA, elliptic curve cryptographic schemes, lattice cartographic schemes, multivariate cryptographic schemes, code-based cryptographic schemes, or another suitable asymmetric cryptographic scheme). In some embodiments, the client 1005 encrypts an authentication message 1023 shared by the client 1005 and the sever 1002, or one to which both have access (e.g., an authentication message 542 or 642) using a private key derived from the response 1030 according to an asymmetric encryption scheme and the server 1002 attempts to decrypt the resulting ciphertext using the public key 1040, which the server 1002 must find using the RBCE 1015 which implements computational methods described herein (e.g., those described in connection with FIGS. 5-6). If the server 1002 is able to find the public key 1040 which allows it to successfully decrypt the ciphertext to reproduce the authentication message 1023, the server 1005 knows the client 1002 authentic. Alternatively, the client may transmit the public key 1040 to the sever 1005 directly or provide information allowing the server 1005 to retrieve the public key 1040 from elsewhere, such as a signed blockchain transaction.

The noise generator 1070 may use one or more techniques to add a desired level of errors ("noise") to the responses 1030. In some embodiments, the client 1005 may be configured to add the same predetermined level of noise to all responses 1030. The client 1005 may also be configured to receive a desired level of noise for a given response 1030 from a user of the client 1005 or from the server 1002 as part of the challenge 1020 or instructions accompanying the challenge 1020 (including, but not limited to, the masking instructions 1022).

In some embodiments where the responses 1030 are binary streams, the noise generator 1070 may be configured to invert one or more bits in a response 1030 (i.e., a '0' becomes '1' and a '1' becomes '0'). The noise generator 1070 may select bits at random or the noise generator 1070 may be configured to flip particular bits. Similarly, the noise generator 1070 may be configured to flip a random number of bits, a predetermined number of bits, or select a number of bits within a certain range in a random or pseudo-random fashion (e.g., by cycling sequentially, randomly, or according to another suitable algorithm through a finite number of possible choices). The noise generator 1070 may also receive or generate a bit string and apply a binary logic operation to achieve a desired number and ordering of bit flips. The client 1005 may receive this bit string from the server 1005 or may store one or more bitmasks in memory coupled to the processor 1012.

As an example, the response 1030 can be combined with a bitmask which has a '1' corresponding to each but in the response 1030 to flipped through an exclusive—or (XOR) operation. For example, if a response 1030 is ten bits long and has a value of '1010001101' and the desired error level is 3 bits, then XORing the response with bitmask of length 10 having three (and only three) '1' bits will produce a noisy response which has exactly 3 bit errors at the position in the response corresponding to the position. In some embodiments, the response 1030 may be represented as a ternary, rather than binary string. In such embodiments the noise generator 1070 may represent the ternary string in binary form and apply an appropriate bitmask to achieve the same result. Alternatively, the noise generator 1070 may apply a ternary logic function which cyclically permutes the trits (ternary digits) identified by an appropriate ternary tritmask (analogous to a bitmask).

In some embodiments where the client 1005 receives masking instructions 1022 from the server 1002, the server 1002 is configured to expect a predetermined number of errors in the responses 1030 generated by the client 1005 or may receive a desired number of errors from a user of the server 1002. In such embodiments, the server 1002 may use data obtained during enrollment of the APG 1060 of the client 1005 used to characterize devices of the PUF array 1060 as reliable and unreliable as previously described in connection to FIG. 1 and elsewhere. The server 1002 may determine that, for a particular challenge 1020, instructing to the client 1005 to include (rather than exclude) one or more unreliable PUF devices in the response generation process will cause the APG 1010 to produce a response 1030 with a desired number of errors (or at least a desired number) with a minimum acceptable likelihood (e.g., a 95% chance of producing a response 1030 with the desired number of errors or at least a desired number of errors). The server 1002 may then generate masking instructions which cause the APG 1010 to include an appropriate number of unreliable devices in the response generation process for the issued challenge 1020. The server 1002 may generate such masking instructions 1020 by any suitable method including, as a non-limiting example randomly selecting unreliable cells or cycling through pre-generated mask strings having an appropriate number of unmasked reliable cells.

The server 1002 may account for the intrinsic CRP error rate of the client 1005 when determining the desired number of errors a response 1030. As a non-limiting example, if the response 1030 is a 256-bit response, the server 1002 may determine, using information characterizing the PUF array 1060 obtained during Enrollment that response is likely to include N errors as a result of the intrinsic CRP error rate of the APG 1010 for PUF devices identified by the challenge 1020. If the desired number of errors is N/2, for example, the server 1002 may generate the masking instructions 1022 to exclude N/2 unreliable devices from the response generation process and substitute those devices with N/2 devices known to be error-free. Alternatively, as another non-limiting example, in embodiments where the client 1005 performs masking procedures independently of the server 1002 on its own in order to reduce errors, the server 1002 may determine that the desired number of errors is N, but the number of errors expected is N−5, for example. In this example, the server 1002 may transmit masking instructions 1022 which cause the client 1005 to include measurements of at least an additional five unreliable devices to produce the desired number of errors in the response 1030. Additionally, the server 1002 may store statistical information indicating the probability of an error being produced by each unreliable device measurement. If that probability is 50%, for example, the server 1002 may determine that ten unreliable device measurements should be included in the response generation process to ensure a high probability that an additional five errors will be introduced into the response 1030.

In some embodiments, the measured characteristics used to generate a response 1030 may be analog quantities. As a non-limiting, example, an APG 1010 using an array of transistors as a PUF array may be configured to measure channel resistances or threshold voltages of transistors in the PUF array. The APG 1010 may then assign a '0' to transistors with a threshold voltage greater than an average value for the entire array or another threshold. In such embodiments, the noise generator 1070 may be configured to operate on such analog measurements by injecting actual electrical noise (i.e., a random or pseudorandom time-varying signal) into circuitry which makes the measurements. The amplitude of the noise may be chosen to ensure that, on average a particular number of measurements will produce errors in corresponding bits of the response 1030 to a particular challenge 1020. As another non-limiting example, the noise generator 1070 may be configured to apply a negative or positive offset sufficient shift the measured values from one or more devices such that resulting binary values incorporated in the response derived from those measurements is changed from '1' to '0' or from '0' to '1'.

In some embodiments, the desired number of errors in the challenge responses 1030 may be determined as the result of performing various security assessments. As a non-limiting example, a client 1005 may be provided with global positioning circuitry allowing it to determine its location using GPS technology, or may be otherwise able to determine its location using Wi-Fi or cellular receivers and triangulation methods, as non-limiting examples. The client 1005 may relay its location to the server 1002 and the server 1002 may determine that the location of the client 1005 is associated with increased security risks by accessing a database associating geographic locations or regions with a numerical indicator of security risks. For instance, the sever 1002 may determine that the location of the client 1005 has recently been a source of hacking attempts or that the client 1005 is located in a combat area in proximity to enemies who may attempt to intercept communications to and from the client 1005. As another non-limiting example, a security assessment may be performed by monitoring traffic on a network the client 1005 uses to communicate with the server 1002. Unusual network traffic, increased errors, irregularities in latency, and/or other information may indicate an increased security risk. In some embodiments, performing a security assessment to determine the desired number of errors in the responses 1030 may comprise retrieving security assessment results and/or historical data from an external device or service.

As above, the server 1002 may instruct the client 1005 to increase the number of errors in the responses 1030 to increase security. In some embodiments, the instruction is conveyed implicitly by way of the masking instructions 1022 which may be generated to include a number of unreliable device measurements in the responses sufficient to generate the desired number of errors in the responses 1030 with greater than a predetermined minimum probability. This may be determined using characteristics of the PUF array 1060 obtained during the Enrollment process. In other embodiments, the server 1002 may include instructions in the challenge 1020 (or with the challenge 1020) which cause the client 1005 to inject noise into analog PUF measurements as described above or instructions causing the client 1005 to flip bit values in the responses 1030 as described above.

In other embodiments, the client 1005 may independently determine a desired number of errors in the responses 1030 in response to performing a security assessment similar to those described above in the context of the server 1002 or a user of the client 1005 may supply an input indicating a desired number of errors in the response 1030. In some embodiments, the client 1005 may measure and/or store information describing statistical characteristics of measurements of the PUF devices belonging to the PUF array 1010. This information may be used by the client 1005 to independently generate masking instructions 1022 similarly to how the masking instructions 1022 are generated by the server 1002 in other embodiments. The client 1005 may mask all cells deemed unreliable to realize zero or effectively-zero error rates. The client 1005 may also generate masking instructions 1022 which include a number of unreliable devices in the response generation process to achieve the desired number of errors in the responses 1030 as described above. The statistical information may also be used to determine a level of noise injection in embodiments where the noise generator 1070 injects electrical noise into measurements of analog PUF device characteristics as described above. In embodiments where the desired number of errors in the response 1030 is determined on the client side, the client 1005 may transmit information to the server 1002 indicating the number of errors introduced in the responses 1030. In some embodiments where the client 1005 uses independently-generating masking instructions, the client 1005 may transmit the masking instructions used to the server 1002 or may transmit information sufficient for the server to reconstruct the masking instructions 1022. For example, the server 1002 may be configured such that the combination of the challenge 1020 and a desired number of errors transmitted by the client 1005 uniquely identifies corresponding masking instructions 1022 or one of a limited set of possible masking instructions 1022 which may be applied by the sever 1002 to determine an expected noisy response 1030.

It should be understood that certain functions described may be performed by either a client device or a server (or both the client device and the server) in particular embodiments. For example, as described above, a server in some embodiments may generate masking instructions based on characteristics of PUF devices belonging to a client device stored by the server. The server may then transmit masking instructions to the client. In other embodiments, a client device may store statistical or other information characterizing the behavior of PUF devices belonging to the client. In such embodiments, the client may perform error correction independently of the server by generating its own masking instructions that may be used to exclude unreliable device measurements from the challenge generation process. Similarly, a client device in such embodiments may alter its own masking instructions to include unreliable device measurements in order to achieve a desired error rate in the challenge responses generated by the client. As another non-limiting example, either a client or a server (or both) may determine a desired level of errors or noise in challenge responses based on performing a security assessment, as described above.

It should be understood that, unless explicitly stated or otherwise required, the features disclosed in embodiments explicitly described herein and elsewhere in this disclosure may be used in any suitable combinations. Thus, as a non-limiting example, any embodiment disclosed herein may use the public-key matching techniques disclosed herein or omit said techniques, as dictated by the needs of a particular application.

The invention claimed is:

1. A system, comprising:
   a physical-unclonable-function ("PUF") array of PUF devices;
   a processor configured to retrieve data from the PUF array; and
   a memory coupled to the processor, the memory storing instructions that, upon execution by the processor, cause the processor to:
   receive an authentication challenge from a server;
   measure physical characteristics of PUF devices forming a portion of the PUF array specified by the authentication challenge;
   generate an authentication response based on the measured physical characteristics;
   receive a target error level indicating a number of errors desired in the authentication response;
   determine a required number of bits to be altered in a binary representation of the authentication response to produce the number of errors desired in the authentication response;
   alter bit values of a subset of bits of the authentication response having the required number of bits to generate a noisy authentication response;
   transmit the noisy authentication response to the server; and
   encrypt further communication with the server using a client-generated encryption key derived from the authentication response in response to receiving a message confirming successful authentication from the server.

2. The system of claim 1, wherein the memory stores instructions specifying rules mapping possible analog measurement values of physical characteristics of PUF devices belonging to the PUF devices to a set of discrete values; and
   wherein altering the bit values of the subset of bits includes adding electrical noise to electrical measurements of physical characteristics of a subset of PUF devices used to generate the subset of bits.

3. The system of claim 1, wherein the memory stores further instructions that, upon execution by the processor, cause the processor to alter the bit values of the subset of bits by inverting a bit value of each of the subset of bits.

4. The system of claim 3, wherein, the memory stores further instructions that, upon execution by the processor, cause the processor to, when the processor alters the bit values of the subset of bits of the authentication response, the processor alters only a predetermined range of bits belonging to the authentication response.

5. The system of claim 4, wherein the memory stores further instructions that, upon execution by the processor, cause the processor to select, as the predetermined range of bits, a candidate range of bits having a selected number of bits from a discrete set of ranges including differing numbers of bits based on the target error level.

6. The system of claim 3, wherein transmitting the noisy authentication response to the server comprises:
   receiving segmentation instructions indicating a desired number of segments to use when transmitting the noisy authentication response and a desired length of each segment;
   segmenting the noisy authentication response into the desired number of segments; and
   including a respective cryptographic nonce in each segment to produce the desired number of segments, each having the desired length of that segment.

7. The system of claim 6, wherein transmitting the noisy authentication response to the server further comprises:
   forming a respective encryption key from each segment and encrypting an authentication message using that encryption key to produce corresponding ciphertexts; and
   transmitting the corresponding ciphertexts to the server as the noisy authentication response.

8. The system of claim 1, wherein the system is configured to determine, as the target error level, an error level resulting in authentication responses that:
   require less than a first predetermined time to be verified by the server; and
   require greater than second predetermined time to be verified by the system.

9. A system, comprising:
   a processor, a physical-unclonable-function ("PUF") array of PUF devices, and memory coupled to the processor, the memory storing instructions that, upon execution by the processor, cause the processor to:
   receive an authentication challenge from a server;
   determine masking instructions identifying PUF devices belonging to the PUF array;
   determine a set of PUF devices forming a portion of the PUF array specified by the authentication challenge that excludes PUF devices identified by the masking instructions;
   measure physical characteristics of the set of PUF devices;
   generate an authentication response based on the measured physical characteristics and transmit the authentication response to the server; and
   encrypt further communication with the server using a client-generated encryption key derived from the authentication response in response to receiving a message confirming successful authentication from the server.

10. The system of claim 9, wherein the memory stores statistical information characterizing statistics of repeated measurements of the PUF devices belonging to the PUF array;
   wherein the memory stores further instructions that, when executed by the processor cause the processor to:
   determine that a subset of PUF devices specified by the authentication challenge are unreliable;
   include instructions identifying PUF devices belonging to the subset of PUF devices in the masking instructions; and
   transmit information sufficient to identify the PUF devices identified by the masking instructions to the server.

11. The system of claim 10, wherein the memory stores further instructions that, when executed by the processor cause the processor to:
   receive a number of errors desired in the authentication response;
   determine a required number of bits that must be altered in a binary representation of the authentication response to produce the number of errors desired in the authentication response;
   determine, based on the statistical information stored in the memory, that including information indicating measured physical characteristics of a sufficient number of PUF devices belonging to the subset of PUF devices will result in errors in the required number bits with a probability greater than a predetermined threshold; and
   exclude the sufficient number of PUF devices belonging to the subset of PUF devices from the masking instructions.

12. The system of claim 11, wherein the memory stores further instructions that, when executed by the processor cause the processor to:
   perform a security assessment that indicates a level of security risk of communication with the server; and
   output the number of errors desired in the authentication response based on the level of security risk associated with communicating with the server.

13. The system of claim 12 wherein performing the security assessment includes at least one of: determining a geographic location of the system; and determining an identity of a communication network used by the system to communicate with the server.

14. A system, comprising a processor, and memory coupled to the processor, the memory storing:
   (a) challenge-response data, each challenge-response datum associated with one of a plurality of client devices each having a respective physical-unclonable-function ("PUF") array having a respective plurality of PUF devices, each challenge response datum associated with an enrollment challenge issued to an associated client device and an initial response to that enrollment challenge obtained from the associated client device and derived from measurements of physical characteristics of PUF devices belonging to the PUF array of the associated client device; and
   (b) executable instructions that, when executed by the processor, cause the processor to:
   select, as an authentication challenge, a first enrollment challenge retrieved from the memory and belonging to a challenge-response pair associated with a client device possessing a physical-unclonable-function ("PUF") array having a plurality of PUF devices;
   identify, based on challenge-response data associated with the client device, a set of unreliable PUF devices belonging to a portion of the PUF array of the client device specified by the authentication challenge;
   determine a desired number of errors in a response to the authentication challenge;
   determine a number of unreliable devices of the set of unreliable devices having physical characteristics that will produce a response to the authentication challenge having the desired number of errors with a probability higher than a predetermined threshold when used to generate a portion of the response to the authentication challenge;
   determine an expected response to the authentication challenge using an enrollment response belonging to the challenge-response pair from the database previously generated in response to the enrollment challenge by measuring physical characteristics of PUF devices of a portion of the PUF array identified by the enrollment challenge;
   issue the authentication challenge to the client device;
   issue masking instructions to the client device instructing the client device to:
   generate a response to the authentication challenge that:
   includes information indicating measured characteristics of the first set of PUF devices belonging to the portion of the PUF array specified by the challenge; and
   excludes information indicating measured characteristics of the second set of PUF devices belonging to the portion of the PUF array specified by the challenge;
   receive a response to the authentication challenge;
   authenticate the client based on the response to the authentication challenge; and
   transmit a notification to the client device indicating that the client device has been successfully authenticated.

15. The system of claim 14, wherein the memory stores further instructions that, when executed by the processor, cause the processor to:
   receive a message identifying a ciphertext from the client device and retrieve the ciphertext;
   determine, using the ciphertext as the response to the authentication and a server-generated encryption key, that a value of a difference metric indicating a degree of difference between the authentication response and the expected response is less than a predetermined maximum value of the difference metric.

16. The system of claim 15, wherein the memory stores further instructions that, when executed by the processor, cause the processor to:
   retrieve a blockchain transaction from a blockchain as the ciphertext;
   select an expected authentication message associated with the client device from the transaction block; and
   wherein determining that the value of the difference metric between the authentication response and the expected response is less than the predetermined maximum value of the difference metric comprises:
   deriving a cryptographic value using the server-generated encryption key and determining that the cryptographic value matches the authentication message.

17. The system of claim 15, wherein the system is configured to determine, as the desired number of errors, a number or errors producing a number of possible permutations of the authentication response;

wherein a time required by the server to verify the number of possible permutations of the authentication response is less than a first predetermined threshold; and wherein a time required by the client device to verify the number of possible permutations of the authentication response is greater than the time required by server by a multiplier greater than a second predetermined threshold.

18. The system of claim 15, wherein the memory stores further instructions that, when executed by the processor cause the processor to:

perform a security assessment that indicates a level of security risk of communication with the server; and output the number of errors desired in the authentication response based on the level of security risk associated with communicating with the server.

19. The system of claim 18 wherein performing the security assessment includes at least one of:

determining a geographic location of the system; and determining an identity of a communication network used by the system to communicate with the client.

20. The system of claim 14, wherein determining the desired number of errors in the response to the authentication challenge comprises receiving information indicating the desired number of errors from the client device.

* * * * *